US011218597B2

(12) United States Patent
Kan et al.

(10) Patent No.: US 11,218,597 B2
(45) Date of Patent: *Jan. 4, 2022

(54) TECHNIQUES FOR BEHAVIORAL PAIRING IN A CONTACT CENTER SYSTEM

(71) Applicant: Afiniti, Ltd., Hamilton (BM)

(72) Inventors: Ittai Kan, McLean, VA (US); Michael Richard Klugerman, Cambridge, MA (US); Blake Jay Riley, Washington, DC (US)

(73) Assignee: Afiniti, Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,085

(22) Filed: Nov. 9, 2020

(65) Prior Publication Data

US 2021/0058516 A1 Feb. 25, 2021

Related U.S. Application Data

(63) Continuation of application No. 16/877,143, filed on May 18, 2020, now Pat. No. 10,834,263, which is a
(Continued)

(51) Int. Cl.
*H04M 3/523* (2006.01)
*G06Q 10/06* (2012.01)
*G06Q 30/00* (2012.01)

(52) U.S. Cl.
CPC .... *H04M 3/5235* (2013.01); *G06Q 10/06311* (2013.01); *G06Q 10/06315* (2013.01);
(Continued)

(58) Field of Classification Search
CPC ............ G06Q 10/00; G06Q 10/06311; G06Q 10/06315; G06Q 17/60; G06Q 30/01;
(Continued)

(56) References Cited

U.S. PATENT DOCUMENTS 5,155,763 A 10/1992 Bigus et al.
5,206,903 A 4/1993 Kohler et al.
(Continued)

FOREIGN PATENT DOCUMENTS

AU 2008349500 C1 5/2014
AU 2009209317 B2 5/2014
(Continued)

OTHER PUBLICATIONS

Anonymous. (2006) "Performance Based Routing in Profit Call Centers," The Decision Makers' Direct, located at www.decisioncraft. com, Issue Jun. 2002 (3 pages).
(Continued)

*Primary Examiner* — Harry S Hong
(74) *Attorney, Agent, or Firm* — Wilmer Cutler Pickering Hale and Dorr LLP

(57) ABSTRACT

Techniques for behavioral pairing in a contact center system are disclosed. In one particular embodiment, the techniques may be realized as a method for behavioral pairing in a contact center system comprising: determining, by at least one computer processor communicatively coupled to and configured to operate in the contact center system, a plurality of contacts available for connection to an agent; determining, by the at least one computer processor, a plurality of preferred contact-agent pairings among possible pairings between the agent and the plurality of contacts; selecting, by the at least one computer processor, one of the plurality of preferred contact-agent pairings according to a probabilistic network flow model; and outputting, by the at least one computer processor, the selected one of the plurality of preferred contact-agent pairings for connection in the contact center system.

21 Claims, 24 Drawing Sheets

Related U.S. Application Data continuation of application No. 16/559,065, filed on Sep. 3, 2019, now Pat. No. 10,659,613, which is a continuation of application No. 16/363,826, filed on Mar. 25, 2019, now Pat. No. 10,404,861, which is a continuation of application No. 15/918,469, filed on Mar. 12, 2018, now Pat. No. 10,284,727, which is a continuation of application No. 15/691,106, filed on Aug. 30, 2017, now Pat. No. 9,942,405, which is a continuation of application No. 15/582,223, filed on Apr. 28, 2017, now Pat. No. 9,930,180.

(52) U.S. Cl.
CPC .......... *G06Q 30/01* (2013.01); *H04M 3/5232* (2013.01); *H04M 2203/402* (2013.01); *H04M 2203/556* (2013.01)

(58) Field of Classification Search
CPC .. G06Q 40/00; H04M 3/5158; H04M 3/5183; H04M 3/5232; H04M 3/5233; H04M 3/5235; H04M 3/5236; H04M 3/5238; H04M 2203/402; H04M 2203/408; H04M 2203/556
USPC ........................... 379/265.11, 265.12, 265.13
See application file for complete search history.

(56) References Cited

U.S. PATENT DOCUMENTS

| | | |
|---|---|---|
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,372,952 B1 | 5/2008 | Wu et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |

(56) References Cited

U.S. PATENT DOCUMENTS

| | | |
|---|---|---|
| 9,930,180 B1 | 3/2018 | Kan et al. |
| 9,942,405 B1 | 4/2018 | Kan et al. |
| RE46,986 E | 8/2018 | Chishti et al. |
| 10,116,800 B1 | 10/2018 | Kan et al. |
| 10,135,987 B1 | 11/2018 | Chishti et al. |
| RE47,201 E | 1/2019 | Chishti et al. |
| 10,284,727 B2 | 5/2019 | Kan et al. |
| 10,404,861 B2 | 9/2019 | Kan et al. |
| 10,659,613 B2 | 5/2020 | Kan et al. |
| 10,834,263 B2 * | 11/2020 | Kan ............... G06Q 10/06315 |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tai et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0080573 A1 | 3/2016 | Chishti |
| 2017/0064080 A1 | 3/2017 | Chishti et al. |
| 2017/0064081 A1 | 3/2017 | Chishti et al. |
| 2018/0316793 A1 | 11/2018 | Kan et al. |
| 2018/0316794 A1 | 11/2018 | Kan et al. |
| 2019/0222697 A1 | 7/2019 | Kan et al. |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0493292 A2 | 7/1992 |
| EP | 0949793 A1 | 10/1999 |
| EP | 1032188 A1 | 8/2000 |
| EP | 1335572 A2 | 8/2003 |
| GB | 2339643 A | 2/2000 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |

(56) References Cited

FOREIGN PATENT DOCUMENTS

| | | |
|---|---|---|
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| JP | 2015-514371 A | 5/2015 |
| KR | 2002-0044077 | 6/2002 |
| KR | 2013-0099554 | 9/2013 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/17517 A1 | 4/1999 |
| WO | WO-2001/063894 A2 | 8/2001 |
| WO | WO-2006/124113 A2 | 11/2006 |
| WO | WO-2009/097018 A1 | 8/2009 |
| WO | WO-2010/053701 A2 | 5/2010 |
| WO | WO-2011/081514 A1 | 7/2011 |

OTHER PUBLICATIONS

Cleveland, William S., "Robust Locally Weighted Regression and Smoothing Scatterplots," Journal of the American Statistical Association, vol. 74, No. 368, Dec. 1979, pp. 829-836 (8 pages).
Cormen, T. H., et al., "Introduction to Algorithms," 3rd Edition, Chapter 26 Maximum Flow, pp. 708-768 and Chapter 29 Linear Programming, pp. 843-897 (2009).
Gans, N. et al., "Telephone Call Centers: Tutorial, Review and Research Prospects," Manufacturing & Service Operations Management, vol. 5, No. 2, 2003, pp. 79-141, (84 pages).
International Preliminary Report on Patentability issued in connection with PCT Application No. PCT/US2009/066254 dated Jun. 14, 2011 (6 pages).
International Search Report and Written Opinion issued by the European Patent Office as International Searching Authority for International Application No. PCT/IB2016/001762 dated Feb. 20, 2017 (15 pages).
International Search Report and Written Opinion issued by the European Patent Office as International Searching Authority for International Application No. PCT/IB2016/001776 dated Mar. 3, 2017 (16 pages).
International Search Report and Written Opinion issued by the European Patent Office as International Searching Authority for International Application No. PCT/IB2017/000570 dated Jun. 30, 2017 (13 pages).
International Search Report issued in connection with International Application No. PCT/US13/33268 dated May 31, 2013 (2 pages).
International Search Report issued in connection with PCT Application No. PCT/US/2009/054352 dated Mar. 12, 2010, 5 pages.
International Search Report issued in connection with PCT Application No. PCT/US2008/077042 dated Mar. 13, 2009 (3 pages).
International Search Report issued in connection with PCT Application No. PCT/US2009/031611 dated Jun. 3, 2009 (5 pages).
International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Nocedal, J. and Wright, S. J., "Numerical Optimization," Chapter 16 Quadratic Programming, pp. 448-496 (2006) 50 pages.
Ntzoufras, "Bayesian Modeling Using Winbugs". Wiley Interscience, Chapters, Normal Regression Models, Oct. 18, 2007, Redacted version, pp. 155-220 (67 pages).
Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Written Opinion of the International Searching Aurhority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2008/077042 dated Mar. 13, 2009, 6 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 24, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.
Afiniti, "Afiniti® Enterprise Behavioral Pairing™ Improves Contact Center Performance," White Paper, retrieved online from URL: <http://www.afinitit,com/wp-content/uploads/2016/04/Afiniti_White-Paper_Web-Email.pdf> 11 pages (2016).
Chen, G., et al., "Enhanced Locality Sensitive Clustering in High Dimensional Space", Transactions on Electrical and Electronic Materials, vol. 15, No. 3, Jun. 25, 2014, pp. 125-129 (5 pages).
Ioannis Ntzoufras "Bayesian Modeling Using Winbugs An Introduction", Department of Statistics, Athens University of Economics and Business, Wiley-lnterscience, A John Wiley & Sons, Inc., Publication, Chapters, Jan. 1, 2007, pp. 155-220 (67 pages).

* cited by examiner

Behavioral Pairing
Payout Matrix
200

|  | Agent 201 | Agent 202 | Agent 203 |
|---|---|---|---|
| Contact Type 211 | .30 | .30 | .25 |
| Contact Type 212 | .28 | .24 | .20 |
| Contact Type 213 | .15 | .10 | .09 |

FIG. 2

Naïve Behavioral Pairing
Utilization Matrix
300

| | Agent 201 (.33) | Agent 202 (.33) | Agent 203 (.33) |
|---|---|---|---|
| Contact Type 211 (.50) | .16 | .16 | .16 |
| Contact Type 212 (.30) | .10 | .10 | .10 |
| Contact Type 213 (.20) | .07 | .07 | .07 |

FIG. 3

Behavioral Pairing Skill-Based Payout Matrix
400A

|  | A 401 [Skill 421] (.33) | A 402 [Skill 422] (.33) | A 403 [Skill 423] (.33) |
|---|---|---|---|
| CT 411 [Skills 421, 422] (.15) | .30 | .30 | |
| CT 412 [Skills 421, 422] (.15) | .28 | .24 | |
| CT 413 [Skills 421, 422] (.20) | .15 | .10 | |
| CT 411 [Skills 422, 423] (.10) | | .30 | .25 |
| CT 412 [Skills 422, 423] (.30) | | .24 | .20 |
| CT 413 [Skills 422, 423] (.10) | | .10 | .09 |

FIG. 4A

Behavioral Pairing Skill-Based Payout Matrix
500A

|  | A 501 [Skills 521, 522] (.33) | A 502 [Skill 522] (.33) | A 503 [Skill 522] (.33) |
|---|---|---|---|
| CT 511 [Skill 521] (.30) | .30 | | |
| CT 512 [Skill 521] (.30) | .28 | | |
| CT 511 [Skill 522] (.10) | .30 | .30 | .25 |
| CT 512 [Skill 522] (.30) | .28 | .24 | .20 |

FIG. 5A

TECHNIQUES FOR BEHAVIORAL PAIRING IN A CONTACT CENTER SYSTEM

CROSS-REFERENCE TO RELATED APPLICATIONS

This application is a continuation of U.S. patent application Ser. No. 16/877,143, filed May 18, 2020, now U.S. Pat. No. 10,834,263, which is a continuation of U.S. patent application Ser. No. 16/559,065, filed Sep. 3, 2019, now U.S. Pat. No. 10,659,613, issued May 19, 2020, which is a continuation of U.S. patent application Ser. No. 16/363,826, filed Mar. 25, 2019, now U.S. Pat. No. 10,404,861, issued Sep. 3, 2019, which is a continuation of U.S. patent application Ser. No. 15/918,469, filed Mar. 12, 2018, now U.S. Pat. No. 10,284,727, issued May 7, 2019, which is a continuation of U.S. patent application Ser. No. 15/691,106, filed Aug. 30, 2017, now U.S. Pat. No. 9,942,405, issued Apr. 10, 2018, which is a continuation of U.S. patent application Ser. No. 15/582,223, filed Apr. 28, 2017, now U.S. Pat. No. 9,930,180, issued Mar. 27, 2018, each of which is hereby incorporated by reference in its entirety as if fully set forth herein.

This application is also related to U.S. patent application Ser. No. 15/918,442, filed Mar. 12, 2018, now U.S. Pat. No. 10,116,800, issued Oct. 30, 2018, which is a continuation of U.S. patent application Ser. No. 15/582,223, filed Apr. 28, 2017, now U.S. Pat. No. 9,930,180, issued Mar. 27, 2018, each of which is hereby incorporated by reference in its entirety as if fully set forth herein.

FIELD OF THE DISCLOSURE

This disclosure generally relates to pairing contacts and agents in contact centers and, more particularly, to techniques for behavioral pairing in a contact center system.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In other typical contact centers, other strategies may be used, such as "performance-based routing", or a "PBR" strategy.

In other, more advanced contact centers, contacts are paired with agents using a "behavioral pairing", or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to t encourage balanced utilization (or a degree of utilization skew) of agents within a skill queue while nevertheless simultaneously improving overall contact center performance beyond what FIFO or PBR methods will allow. This is a remarkable achievement inasmuch as BP acts on the same calls and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SATMAP", "routing system", "routing engine", etc.) is described in, for example, U.S. Pat. No. 8,879,715, which is incorporated by reference herein.

A BP strategy may use a one-dimensional ordering of agents and contact types in conjunction with a diagonal strategy for determining preferred pairings. However, this strategy may restrict or otherwise limit the type and number of variables that a BP strategy could optimize, or the amount to which one or more variables could be optimized, given more degrees of freedom.

In view of the foregoing, it may be understood that there is a need for a system that enables improving the efficiency and performance of pairing strategies that are designed to choose among multiple possible pairings such as a BP strategy.

SUMMARY OF THE DISCLOSURE

Techniques for behavioral pairing in a contact center system are disclosed. In one particular embodiment, the techniques may be realized as a method for behavioral pairing in a contact center system comprising: determining, by at least one computer processor communicatively coupled to and configured to operate in the contact center system, a plurality of contacts available for connection to an agent; determining, by the at least one computer processor, a plurality of preferred contact-agent pairings among possible pairings between the agent and the plurality of contacts; selecting, by the at least one computer processor, one of the plurality of preferred contact-agent pairings according to a probabilistic network flow model; and outputting, by the at least one computer processor, the selected one of the plurality of preferred contact-agent pairings for connection in the contact center system.

In accordance with other aspects of this particular embodiment, the probabilistic network flow model may be a network flow model for balancing agent utilization, a network flow model for applying an amount of agent utilization skew, or a network flow model for optimizing an overall expected value of at least one contact center metric. Also, the at least one contact center metric may be at least one of revenue generation, customer satisfaction, and average handle time.

In accordance with other aspects of this particular embodiment, the probabilistic network flow model may be a network flow model constrained by agent skills and contact skill needs. Also, the probabilistic network flow model may be adjusted to minimize agent utilization imbalance according to the constraints of the agent skills and the contact skill needs.

In accordance with other aspects of this particular embodiment, the probabilistic network flow model may incorporate expected payoff values based on an analysis of at least one of historical contact-agent outcome data and contact attribute data.

In another particular embodiment, the techniques may be realized as a system for behavioral pairing in a contact center system comprising at least one computer processor communicatively coupled to and configured to operate in the contact center system, wherein the at least one computer processor is further configured to perform the steps in the above-discussed method.

In another particular embodiment, the techniques may be realized as an article of manufacture for behavioral pairing in a contact center system comprising a non-transitory processor readable medium and instructions stored on the medium, wherein the instructions are configured to be readable from the medium by at least one computer processor communicatively coupled to and configured to operate in the contact center system and thereby cause the at least one computer processor to operate to perform the steps in the above-discussed method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

FIG. 2 shows an example of a BP payout matrix according to embodiments of the present disclosure.

FIG. 3 depicts an example of a naïve BP utilization matrix according to embodiments of the present disclosure.

FIG. 4A shows an example of a BP skill-based payout matrix according to embodiments of the present disclosure.

FIG. 5A depicts an example of a BP skill-based payout matrix according to embodiments of the present disclosure.

DETAILED DESCRIPTION

Figure 1:
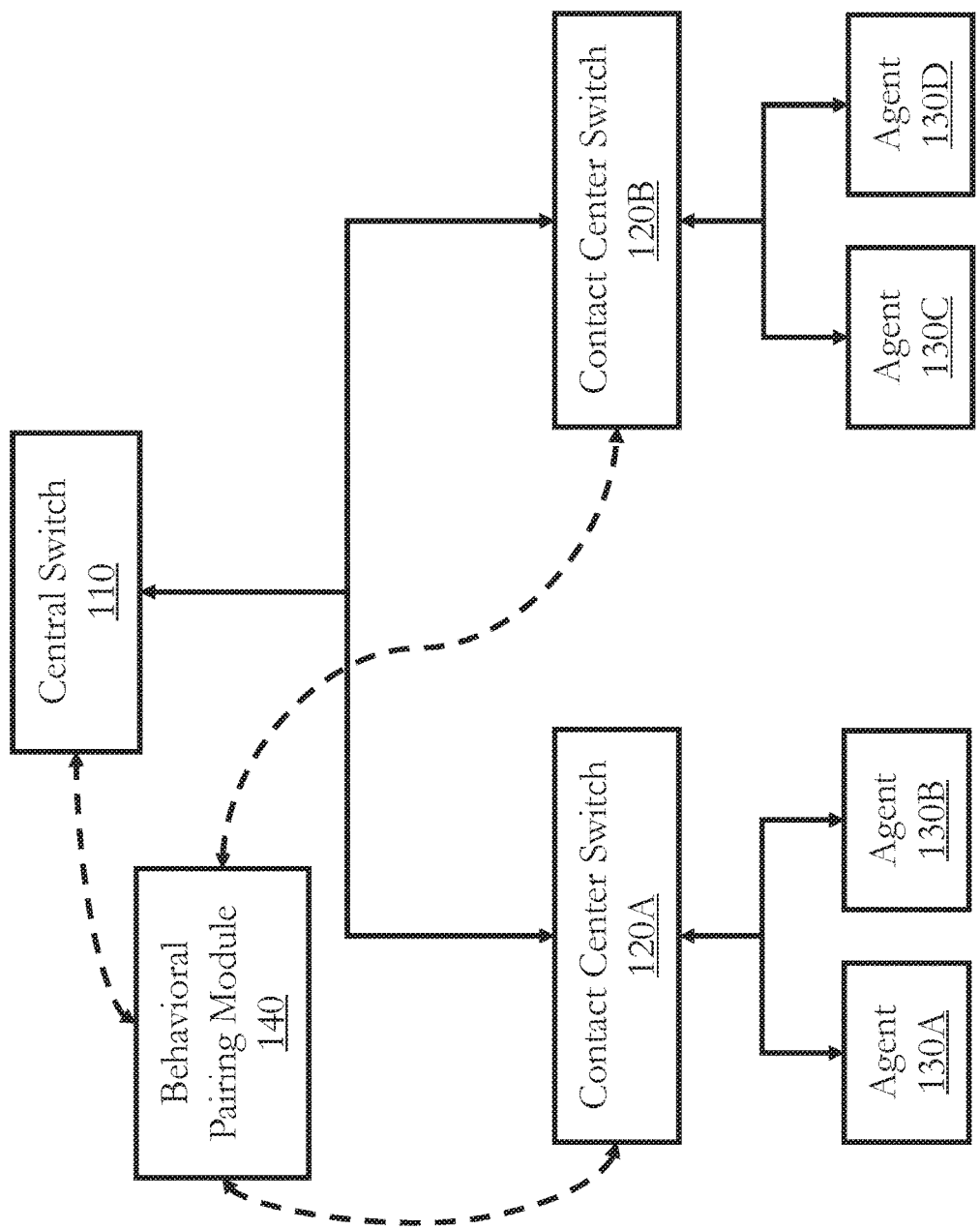
FIG. 1 shows a block diagram of a contact center according to embodiments of the present disclosure.

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In other typical contact centers, other strategies may be used, such as "performance-based routing", or a "PBR" strategy.

In other, more advanced contact centers, contacts are paired with agents using a "behavioral pairing", or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization (or a degree of utilization skew) of agents within a skill queue while nevertheless simultaneously improving overall contact center performance beyond what FIFO or PBR methods will allow. This is a remarkable achievement because BP acts on the same calls and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SATMAP", "routing system", "routing engine", etc.) is described in, for example, U.S. Pat. No. 8,879,715, which is incorporated by reference herein.

A BP strategy may use a one-dimensional ordering of agents and contact types in conjunction with a diagonal strategy for determining preferred pairings. However, this strategy may restrict or otherwise limit the type and number of variables that a BP strategy could optimize, or the amount to which one or more variables could be optimized, given more degrees of freedom.

In view of the foregoing, it may be understood that there is a need for a system that enables improving the efficiency and performance of pairing strategies that are designed to choose among multiple possible pairings such as a BP strategy. Such a system may offer myriad benefits, including, in some embodiments, optimization based on comparative advantages at runtime; maintenance of uniform or approximately uniform utilization of agents; consolidation of models across skills into a single coherent model or a smaller number of coherent models; creation of more complex, sophisticated, and capable models; etc. As described in detail below, the techniques may be multidimensional (e.g., multivariate) in nature, and may use linear programming, quadratic programming, or other optimization techniques for determining preferred contact-agent pairings. Examples of these techniques are described in, for example, Cormen et al., *Introduction to Algorithms,* 3rd ed., at 708-68 and 843-897 (Ch. 26. "Maximum Flow" and Ch. 29 "Linear Programming") (2009), and Nocedal and Wright, *Numerical Optimization,* at 448-96 (2006), which are hereby incorporated by reference herein.

FIG. 1 shows a block diagram of a contact center system 100 according to embodiments of the present disclosure. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the contact center system 100 may include a central switch 110. The central switch 110 may receive incoming contacts (e.g., callers) or support outbound connections to contacts via a telecommunications network (not shown). The central switch 110 may include contact routing hardware and software for helping to route contacts among one or more contact centers, or to one or more PBX/ACDs or other queuing or switching components, including other Internet-based, cloud-based, or otherwise networked contact-agent hardware or software-based contact center solutions.

The central switch 110 may not be necessary such as if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110. In embodiments, various topologies of routing and network components may be configured to implement the contact center system.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B.

The contact center system 100 may also be communicatively coupled to an integrated service from, for example, a third party vendor. In the example of FIG. 1, BP module 140 may be to communicatively coupled to one or more switches in the switch system of the contact center system 100, such as central switch 110, contact center switch 120A, or contact center switch 120B. In some embodiments, switches of the contact center system 100 may be communicatively coupled to multiple BP modules. In some embodiments, BP module 140 may be embedded within a component of a contact center system (e.g., embedded in or otherwise integrated with a switch, or a "BP switch"). The BP module 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown).

A contact center may include multiple pairing modules (e.g., a BP module and a FIFO module) (not shown), and one or more pairing modules may be provided by one or more different vendors. In some embodiments, one or more pairing modules may be components of BP module 140 or one or more switches such as central switch 110 or contact center switches 120A and 120B. In some embodiments, a BP module may determine which pairing module may handle pairing for a particular contact. For example, the BP module may alternate between enabling pairing via the BP module and enabling pairing with the FIFO module. In other embodiments, one pairing module (e.g., the BP module) may be configured to emulate other pairing strategies. For example, a BP module, or a BP component integrated with BP components in the BP module, may determine whether the BP module may use BP pairing or emulated FIFO pairing for a particular contact. In this case, "BP on" may refer to times when the BP module is applying the BP pairing strategy, and "BP off" may refer to other times when the BP module is applying a different pairing strategy (e.g., FIFO).

In some embodiments, regardless of whether pairing strategies are handled by separate modules, or if some pairing strategies are emulated within a single pairing module, the single pairing module may be configured to monitor and store information about pairings made under any or all pairing strategies. For example, a BP module may observe and record data about FIFO pairings made by a FIFO module, or the BP module may observe and record data about emulated FIFO pairings made by a BP module operating in FIFO emulation mode.

FIG. 2 shows an example of a BP payout matrix 200 according to embodiments of the present disclosure. In this simplified, hypothetical computer-generated model of a contact center system, there are three agents (Agents 201, 202, and 203), and there are three contact types (Contact Types 211, 212, and 213). Each cell of the matrix indicates the "payout," or the expected outcome or expected value of a contact-agent interaction between a particular agent and a contact of the indicated contact type. In real-world contact center systems, there could be dozens of agents, hundreds of agents, or more, and there could be dozens of contact types, hundreds of contact types, or more.

In BP payout matrix 200, the payout for an interaction between Agent 201 and a contact of Contact Type 211 is 0.30, or 30%. The other payouts for Agent 201 are 0.28 for Contact Type 212 and 0.15 for Contact Type 213. The payouts for Agent 202 are 0.30 for Contact Type 211, 0.24 for Contact Type 212, and 0.10 for Contact Type 213. The payouts for Agent 203 are 0.25 for Contact Type 211, 0.20 for Contact Type 212, and 0.09 for Contact Type 213.

A payout could represent the expected value for any of a variety of different metrics or optimized variables. Examples of optimized variables include conversion rates on sales, customer retention rates, customer satisfaction rates, average handle time measurements, etc., or combinations of two or more metrics. For example, if BP payout matrix 200 models a retention queue in a contact center system, each payout may represent the likelihood that an agent will "save" or retain a customer of a particular contact type, e.g., there is a 0.30 (or 30%) chance that Agent 201 will save a contact determined to be of Contact Type 211.

In some embodiments, the BP payout matrix 200 or other similar computer-generated model of the contact center system may be generated using historical contact-agent interaction data. For example, they BP payout matrix 200 may incorporate a rolling window several weeks, several months, several years, etc. of historical data to predict or otherwise estimate the payouts for a given interaction between an agent and a contact type. As agent workforces change, the model may be updated to reflect the changes to the agent workforce, including hiring new agents, letting existing agents go, or training existing agents on new skills. Contact types may be generated based on information about expected contacts and existing customers, such as customer relationship management (CRM) data, customer attribute data, third-party consumer data, contact center data, etc., which may include various types of data such as demographic and psychographic data, and behavioral data such as past purchases or other historical customer information. The BP payout matrix 200 may be updated in real time or periodically, such as hourly, nightly, weekly, etc. to incorporate new contact-agent interaction data as it becomes available.

FIG. 3 depicts an example of a naïve BP utilization matrix 300 according to embodiments of the present disclosure. As for the BP payout matrix 200 (FIG. 2), this simplified, hypothetical computer-generated model of a contact center system, there are three agents (Agents 201, 202, and 203), and there are three contact types (Contact Types 211, 212, and 213). In real-world contact center systems, there could be dozens of agents, hundreds of agents, or more, and there could be dozens of contact types, hundreds of contact types, or more.

Under a BP strategy, agents are preferentially paired with contacts of particular contact types according to the computer-generated BP models. In an L1 environment, the contact queue is empty, and multiple agents are available, idle, or otherwise ready and waiting for connection to a contact. For example, in a chat context, an agent may have a capacity to chat with multiple contacts concurrently. In these environments, an agent may be ready for connection to one or more additional contacts while multitasking in one or more other channels such as email and chat concurrently.

In some embodiments, when a contact arrives at the queue or other component of the contact center system, the BP strategy analyzes information about the contact to determine the contact's type (e.g., a contact of Contact Type 211, 212, or 213). The BP strategy determines which agents are available for connection to the contact and selects, recommends, or otherwise outputs a pairing instruction for the most preferred available agent.

In an L2 environment, multiple contacts are waiting in queue for connection to an agent, and none of the agents is available, free, or otherwise ready for connection to a contact. The BP strategy analyzes information about each contact to determine each contact's type (e.g., one or contacts of Contact Types 211, 212, or 213). In some embodiments, when an agent becomes available, the BP strategy determines which contacts are available for connection to the agent and selects, recommends, or otherwise outputs a pairing instruction for the most preferred available contact.

As shown in the header row of the naïve BP utilization matrix 300, each agent has an expected availability or a target utilization. In this example, the BP strategy is targeting a balanced agent utilization of ⅓ ("0.33") for each of the three Agents 201, 202, and 203. Thus, over time, each agent is expected to be utilized equally, or approximately equally. This configuration of BP is similar to FIFO insofar as both BP and FIFO target an unbiased, or balanced, agent utilization.

This configuration of BP is dissimilar to performance-based routing (PBR) insofar as PBR targets a skewed, or unbalanced, agent utilization, intentionally assigning a disproportionate number of contacts to relatively higher-performing agents. Other configurations of BP may be similar to PBR insofar as other BP configurations may also target a skewed agent utilization. Additional information about these and other features regarding skewing agent or contact utilization (e.g., "kappa" and "rho" functionality) is described in, for example, U.S. patent application Ser. No. 14/956,086 and Ser. No. 14/956,074, which are hereby incorporated by reference herein.

As shown in the header column of the naïve BP utilization matrix 300, each contact type has an expected availability (e.g., frequency of arrival) or a target utilization. In this example, contacts of Contact Type 211 are expected to arrive 50% ("0.50") of the time, contacts of Contact Type 212 are expected to arrive 30% ("0.30") of the time, and contacts of type Contact Type 212 are expected to arrive the remaining 20% ("0.20") of the time.

Each cell of the matrix indicates the target utilization, or expected frequency, of a contact-agent interaction between a particular agent and a contact of the indicated contact type. In the example of naïve BP utilization matrix 300, agents are expected to be assigned equally to each contact type according to each contact type's frequency. Contacts of Contact Type 211 are expected to arrive in the queue 50% of the time, with approximately one-third of these contacts assigned to each of Agents 201, 202, and 203. Overall, contact-agent interactions between Contact Type 211 and Agent 201 are expected to occur approximately 16% ("0.16") of the time, between Contact Type 211 and Agent 202 approximately 16% of the time, and between Contact Type 211 and Agent 203 approximately 16% of the time. Similarly, interactions between contacts of Contact Type 212 (30% frequency) and each of the Agents 201-203 are expected to occur approximately 10% ("0.01") of the time each, and interactions between contacts of Contact Type 213 (20% frequency) and each of the Agents 201-203 are expected to occur approximately 7% ("0.07") of the time.

The naïve BP utilization matrix 300 also represents approximately the same distribution of contact-agent interactions that would arise under a FIFO pairing strategy, under which each contact-agent interaction would be equally likely (normalized for the frequency of each contact type). Under naïve BP and FIFO, the targeted (and expected) utilization of each agent is equal: one-third of the contact-agent interactions to each of the three Agents 201-203.

Taken together, the BP payout matrix 200 (FIG. 2) and the naïve BP utilization matrix 300 enable determining an expected overall performance of the contact center system, by computing an average payout weighted according to the frequency distribution of each contact-agent interaction shown in the naïve BP utilization matrix 300: (0.30+0.30+ 0.25)(0.50)(⅓)+(0.28+0.24+0.20)(0.30)(⅓)+(0.15+0.10+ 0.09)(0.20)(⅓)≈0.24. Thus, the expected performance of the contact center system under naïve BP or FIFO is approximately 0.24 or 24%. If the payouts represent, for example, retention rates, the expected overall performance would be a 24% save rate.

FIGS. 4A-4G show an example of a more sophisticated BP payout matrix and network flow. In this simplified, hypothetical contact center, agents or contact types may have different combinations of one or more skills (i.e., skill sets), and linear programming-based network flow optimization techniques may be applied to increase overall contact center performance while maintaining a balanced utilization across agents and contacts.

FIG. 4A shows an example of a BP skill-based payout matrix 400A according to embodiments of the present disclosure. The hypothetical contact center system represented in BP skill-based payout matrix 400A is similar to the contact center system represented in BP payout matrix 200 (FIG. 2) insofar as there are three agents (Agents 401, 402, and 403) having an expected availability/utilization of approximately one-third or 0.33 each, and there are three contact types (Contact Types 411, 412, and 413) having an expected frequency/utilization of approximately 25% (0.15+ 0.10), 45% (0.15+0.30), and 30% (0.20+0.10), respectively.

However, in the present example, each agent has been assigned, trained, or otherwise made available to a particular skill (or, in other example contact center systems, sets of multiple skills). Examples of skills include broad skills such as technical support, billing support, sales, retention, etc.; language skills such as English, Spanish, French, etc.; narrower skills such as "Level 2 Advanced Technical Support," technical support for Apple iPhone users, technical support for Google Android users, etc.; and any variety of other skills.

Agent 401 is available for contacts requiring at least Skill 421, Agent 402 is available for contacts requiring at least Skill 422, and Agent 403 is available for contacts requiring at least Skill 423.

Also in the present example, contacts of each type may arrive requiring one or more of Skills 421-423. For example, a caller to a call center may interact with an Interactive Voice Response (IVR) system, touch-tone menu, or live operator to determine which skills the particular caller/contact requires for the upcoming interaction. Another way to consider a "skill" of a contact type is a particular need the contact has, such as buying something from an agent with a sales skill, or troubleshooting a technical issue with an agent having a technical support skill.

In the present example, 0.15 or 15% of contacts are expected to be of Contact Type 411 and require Skill 421 or Skill 422; 0.15 or 15% of contacts are expected to be of Contact Type 412 and require Skill 421 or 422; 0.20 or 20% of contacts are expected to be of Contact Type 413 and require Skill 421 or 422; 0.10 or 10% of contacts are expected to be of Contact Type 411 and require Skill 422 or Skill 423; 0.30 or 30% of contacts are expected to be of Contact Type 412 and require Skill 422 or Skill 423; 0.10 or 10% of contacts are expected to be of Contact Type 413 and require Skill 422 or Skill 423.

In some embodiments, Agents may be required to have the union of all skills determined to be required by a particular contact (e.g., Spanish language skill and iPhone technical support skill). In some embodiments, some skills may be preferred but not required (i.e., if no agents having the skill for iPhone technical support are available immediately or within a threshold amount of time, a contact may be paired with an available Android technical support agent instead).

Each cell of the matrix indicates the payout of a contact-agent interaction between a particular agent with a particular skill or skill set and a contact with a particular type and need (skill) or set of needs (skill set). In the present example, Agent 401, which has Skill 421, may be paired with contacts of any Contact Type 411, 412 or 413 when they require at least Skill 421 (with payouts 0.30, 0.28, and 0.15, respectively). Agent 402, which has Skill 422, may be paired with contacts of any Contact Type 411, 412, or 413 when they require at least Skill 422 (with payouts 0.30, 0.24, 0.10, 0.30, 0.24, and 0.10, respectively). Agent 403, which has Skill 423, may be paired with contacts of any Contact Type 411, 412, or 413 when they require at least Skill 423 (with payouts 0.25, 0.20, and 0.09, respectively).

Empty cells represent combinations of contacts and agents that would not be paired under this BP pairing strategy. For example, Agent 401, which has Skill 421, would not be paired with contacts that do not require at least Skill 421. In the present example, the 18-cell payout matrix includes 6 empty cells, and the 12 non-empty cells represent 12 possible pairings.

Figure 4B:
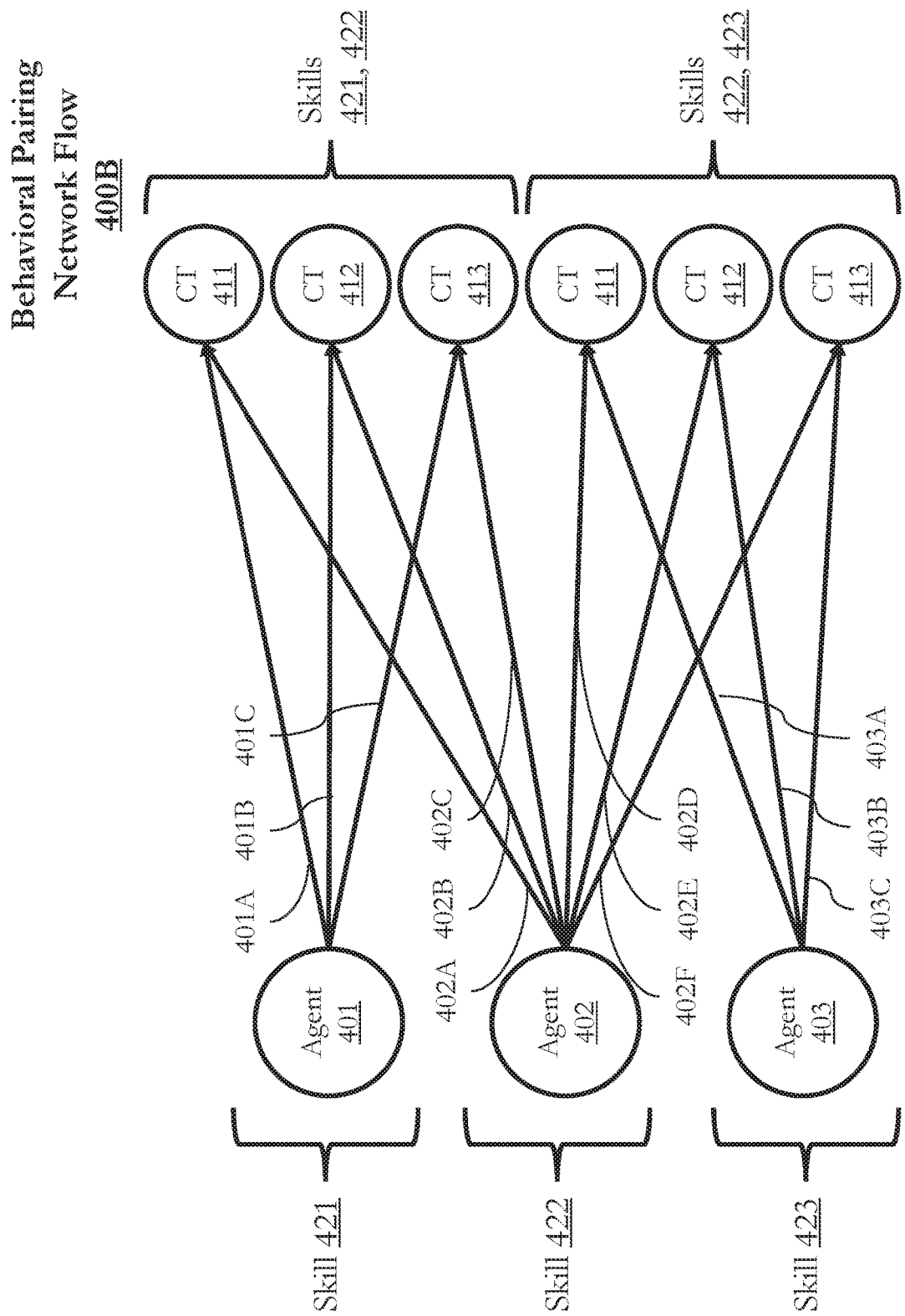
FIG. 4B shows an example of a BP network flow according to embodiments of the present disclosure.

FIG. 4B shows an example of a BP network flow 400B according to embodiments of the present disclosure. BP network flow 400B shows Agents 401-403 as "sources" on the left side of the network (or graph) and Contact Types 411-413 for each skill set as "sinks" on the right side of the network. Each edge in BP network flow 400B represents a possible pairing between an agent and a contact having a particular type and set of needs (skills). For example, edge 401A represents a contact-agent interaction between Agent 401 and contacts of Contact Type 411 requiring Skill 421 or Skill 422. Edges 401B, 401C, 402A-F, and 403A-C represent the other possible contact-agent pairings for their respective agents and contact types/skills as shown.

Figure 4C:
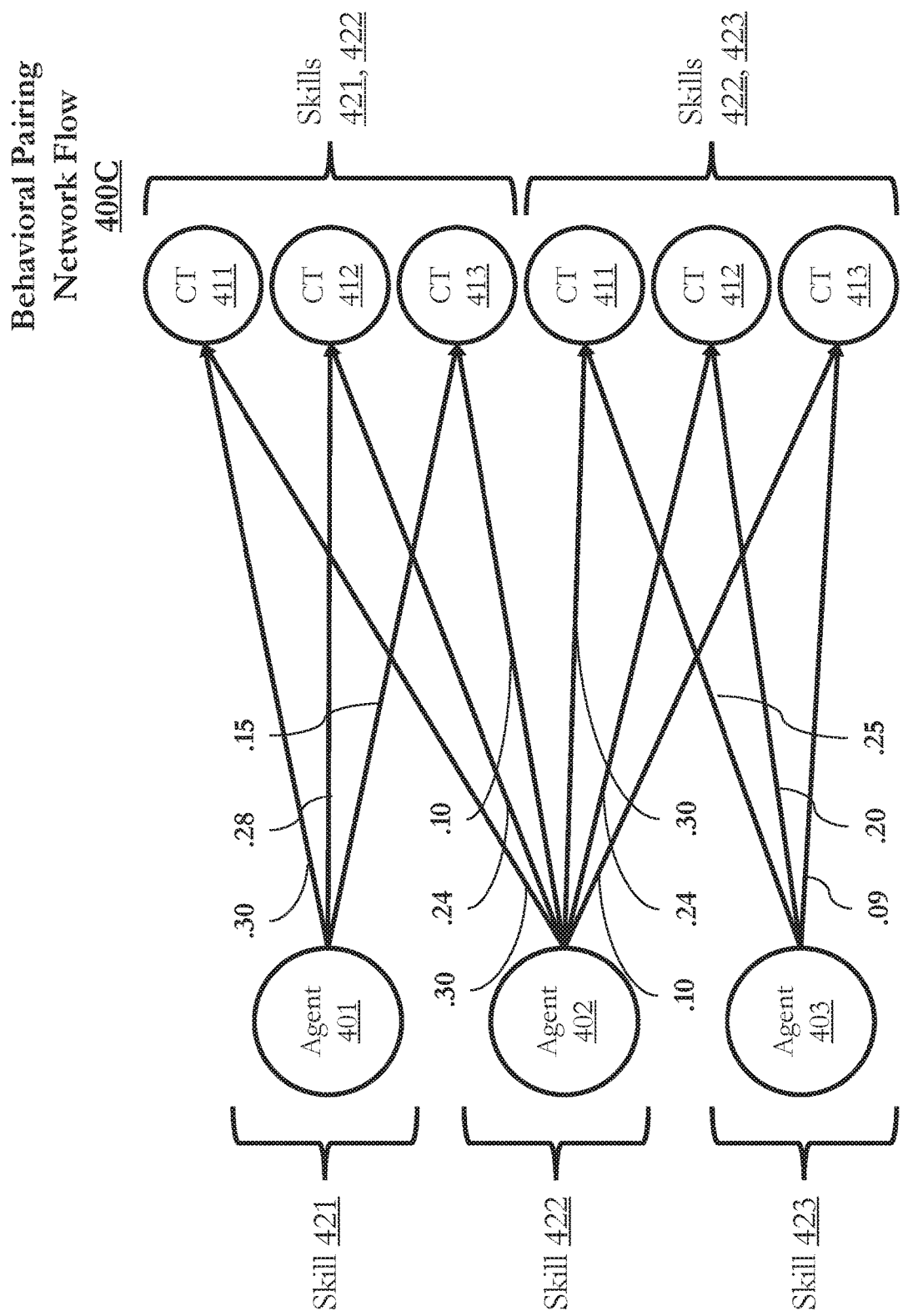
FIG. 4C shows an example of a BP network flow according to embodiments of the present disclosure.

FIG. 4C shows an example of a BP network flow 400C according to embodiments of the present disclosure. BP network flow 400C is a network/graph representation of BP payout matrix 400A (FIG. 4A). BP network flow 400C is identical to BP network flow 400B (FIG. 4B) except, for clarity, the identifiers for each edge are not shown, and instead it shows the payout for each edge, e.g., 0.30 on edge 401A, 0.28 on edge 401B, and 0.15 on edge 401C for Agent 401, and the corresponding payouts for each edge for Agents 402 and 403.

Figure 4D:
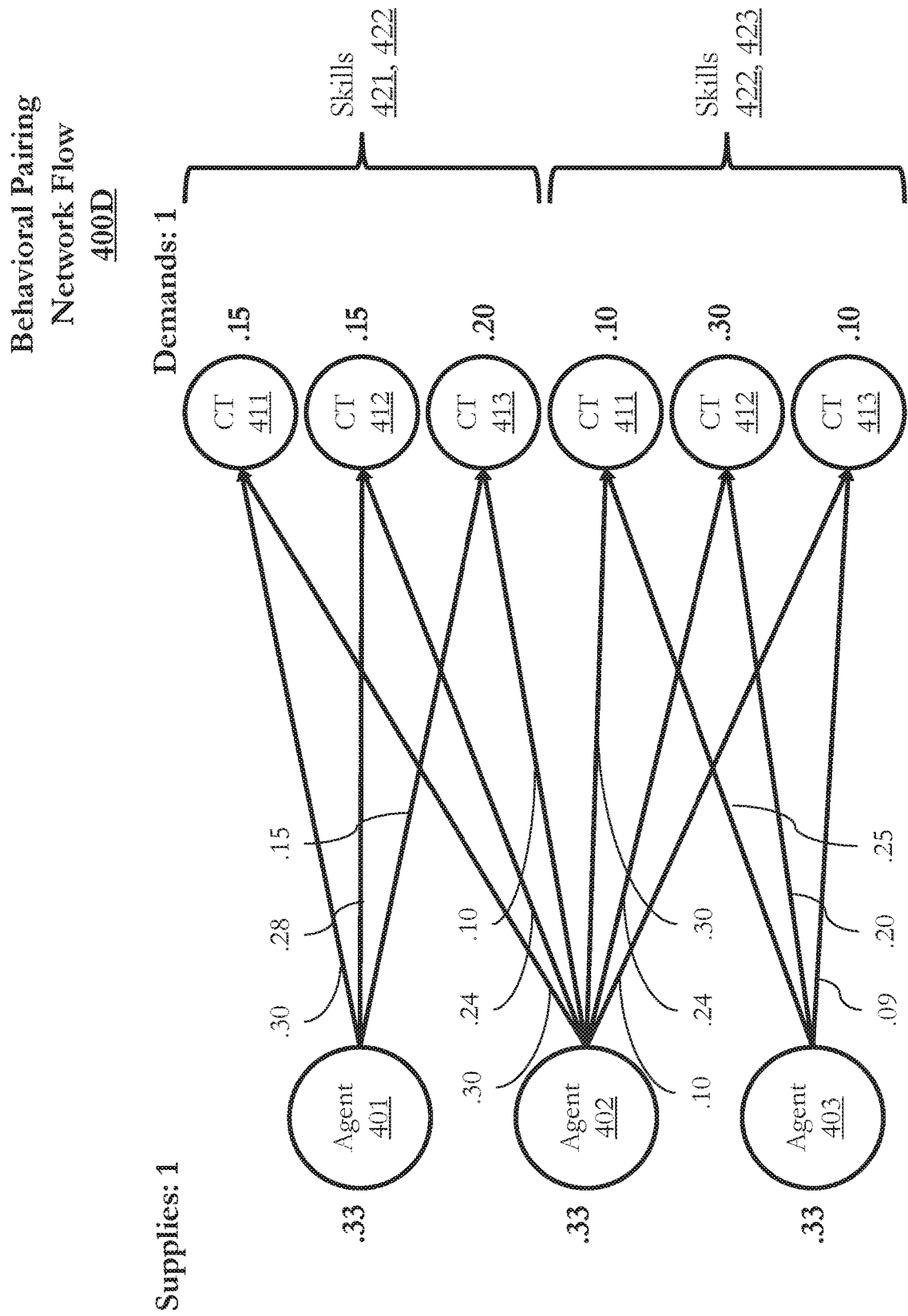
FIG. 4D shows an example of a BP network flow according to embodiments of the present disclosure.

FIG. 4D shows an example of a BP network flow 400D according to embodiments of the present disclosure. BP network flow 400D is identical to BP network flow 400C (FIG. 4C) except, for clarity, the skills for each agent 401-403 are not shown, and instead it shows the relative "supplies" provided by each agent and "demands" required by each contact type/skill combination. Each agent provides a "supply" equivalent to the expected availability or target utilization of each agent (one-third each, for a total supply of 1 or 100%). Each contact type/skill demands an amount of agent supply equivalent to the expected frequency or target utilization of each contact type/skill (0.15, 0.15, 0.20, 0.10, 0.30, 0.10, respectively, for a total demand of 1 or 100%). In this example, the total supply and demand are normalized or otherwise configured to equal one another, and the capacity or bandwidth along each edge is considered infinite or otherwise unlimited (i.e., an edge may describe "who can be paired with whom," not "how much," or "how many times"). In other embodiments, there may be a supply/demand imbalance, or there may be quotas or otherwise limited capacities set for some or all edges.

Figure 4E:
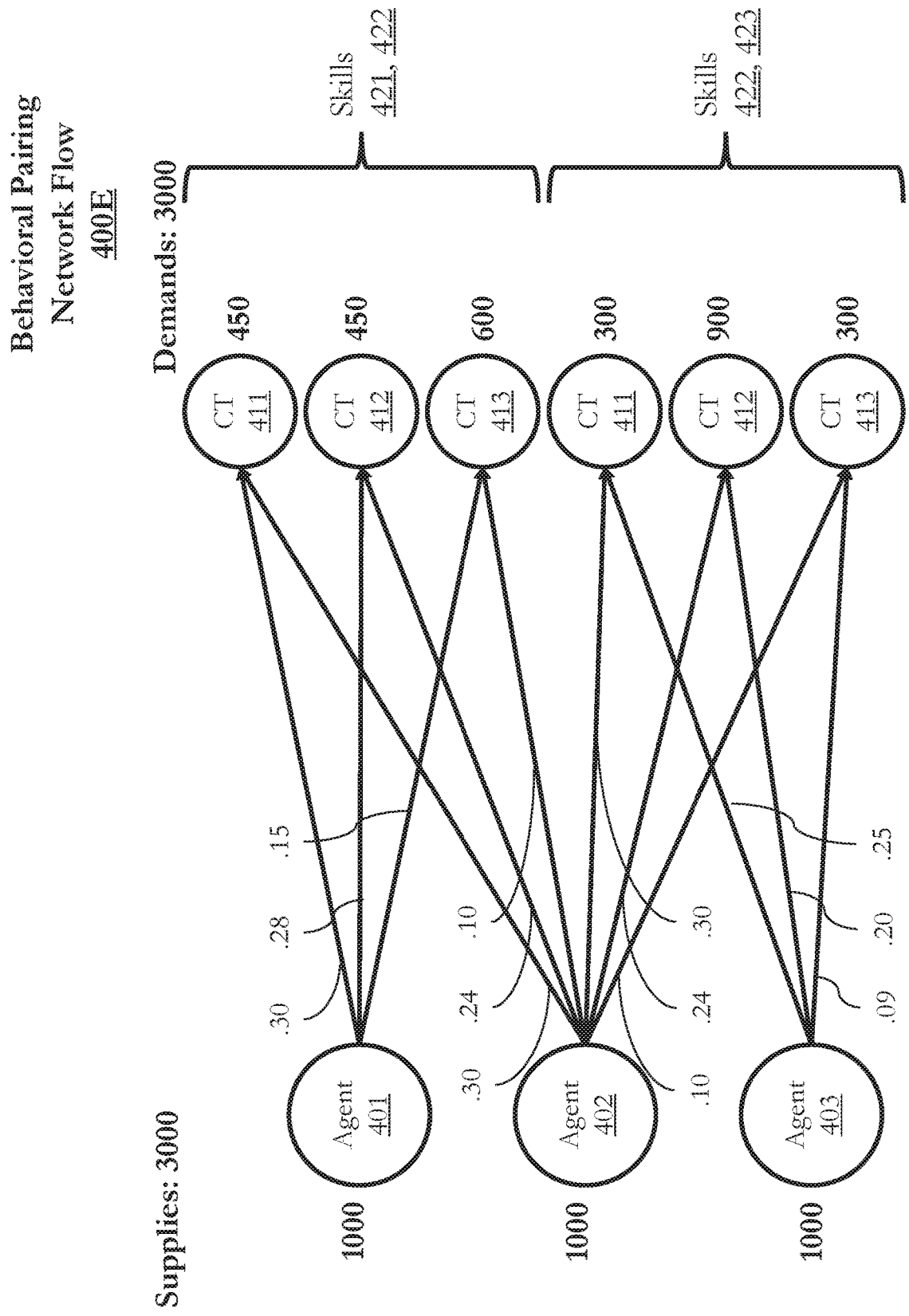
FIG. 4E shows an example of a BP network flow according to embodiments of the present disclosure.

FIG. 4E shows an example of a BP network flow 400E according to embodiments of the present disclosure. BP network flow 400E is identical to BP network flow 400D (FIG. 4D) except, for ease of representation, the supplies and demands have been scaled by a factor of 3000. In doing so, the supply for each agent is shown to be 1000 instead of one-third, and the total supply is shown to be 3000. Similarly, the relative demands for each contact type/skill set has been scaled and total 3000 as well. In some embodiments, no scaling occurs. In other embodiments, the amount of scaling may vary and be greater or smaller than 3000.

Figure 4F:
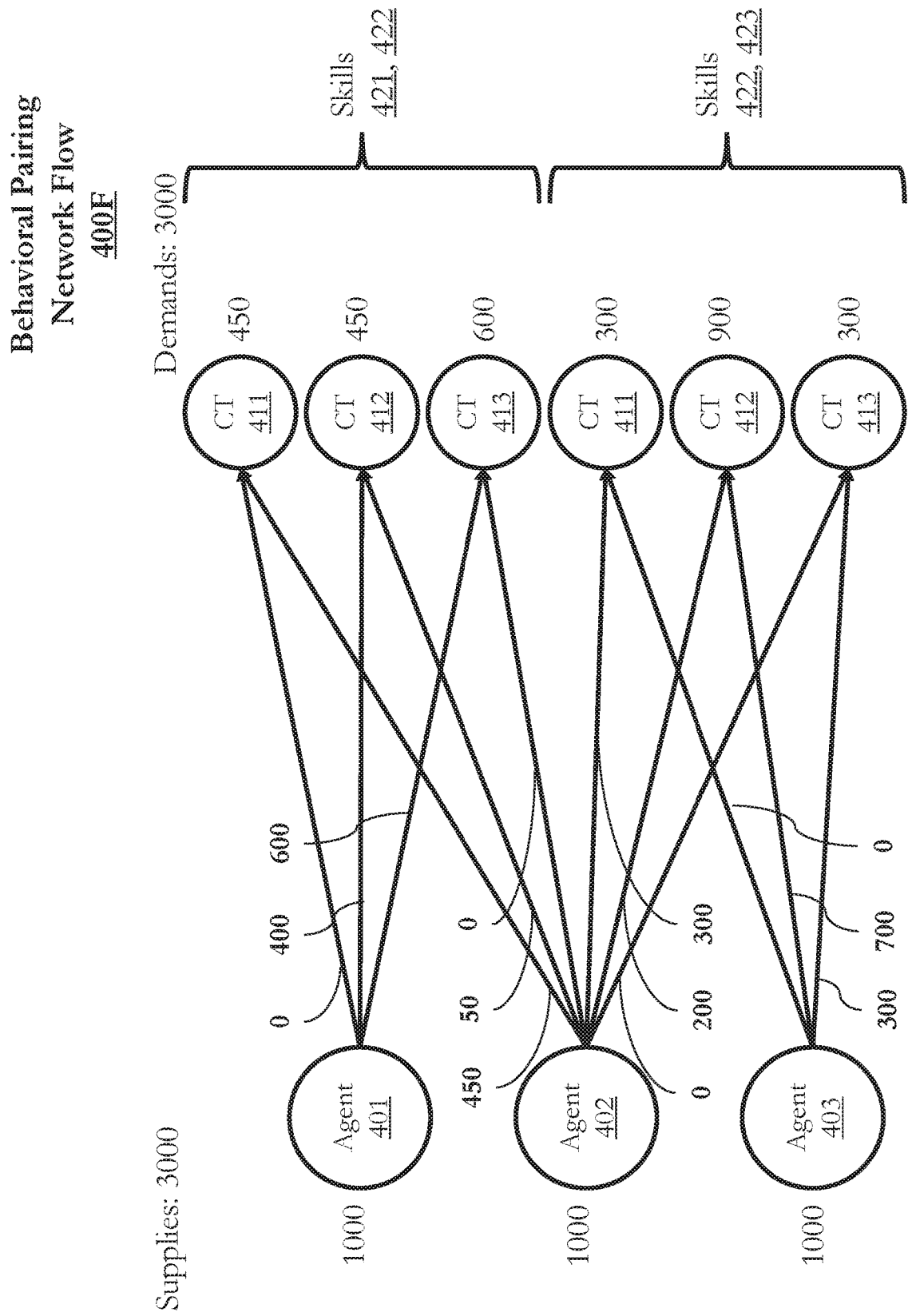
FIG. 4F shows an example of a BP network flow according to embodiments of the present disclosure.

FIG. 4F shows an example of a BP network flow 400F according to embodiments of the present disclosure. BP network flow 400F is identical to BP network flow 400E (FIG. 4E) except, for clarity, the payouts along each edge are not shown, and instead it shows one solution for the BP network flow 400F. In some embodiments, a "maximum flow" or "max flow" algorithm, or other linear programming algorithm, may be applied to the BP network flow 400F to determine one or more solutions for optimizing the "flow" or "allocation" of the supplies (sources) to satisfy the demands (sinks), which may balance utilization of agents and contacts.

In some embodiments, the objective may also be to maximize the overall expected value for the metric or metrics to be optimized. For example, in a sales queue, the metric to optimize may be conversion rate, and the max flow objective is to maximize the overall expected conversion rate. In environments where multiple max flow solutions are available, one technique for selecting a solution may be to select the "maximum cost" or "max cost" solution, i.e., the solution that results in the highest overall payoffs under max flow.

In this example, Agents 401-403 represent the sources, and Contact Types 411-413 with various skill set combinations represent the sinks. In some contact center environments, such as an L2 (contact surplus) environment, the network flow may be reversed, so that contacts waiting in queue are the sources providing supplies, and the possible agents that may become available are the sinks providing demands.

BP network flow 400F shows an optimal flow solution determined by a BP module or similar component. According to this solution, of which there could be several to choose among, or to be selected at random, edge 401A (from Agent 401 to Contact Type 411 with Skills 421 and 422) has an optimal flow of 0; edge 401B (from Agent 401 to Contact Type 412 with Skills 421 and 422) has an optimal flow of 400; and edge 401C (from Agent 401 to Contact Type 413 with Skills 421 and 422) has an optimal flow of 600. Similarly, the optimal flows for edges 402A-F for Agent 402 are 450, 50, 0, 300, 200, and 0, respectively; and the optimal flows for edges 403A-C for Agent 403 are 0, 700, and 300, respectively. As explained in detail below, this optimal flow solution describes the relative proportion of contact-agent interactions (or the relative likelihoods of selecting particular contact-agent interactions) that will achieve the target utilization of agents and contacts while also maximizing the expected overall performance of the contact center system according to the payouts for each pair of agent and contact type/skill set.

Figure 4G:
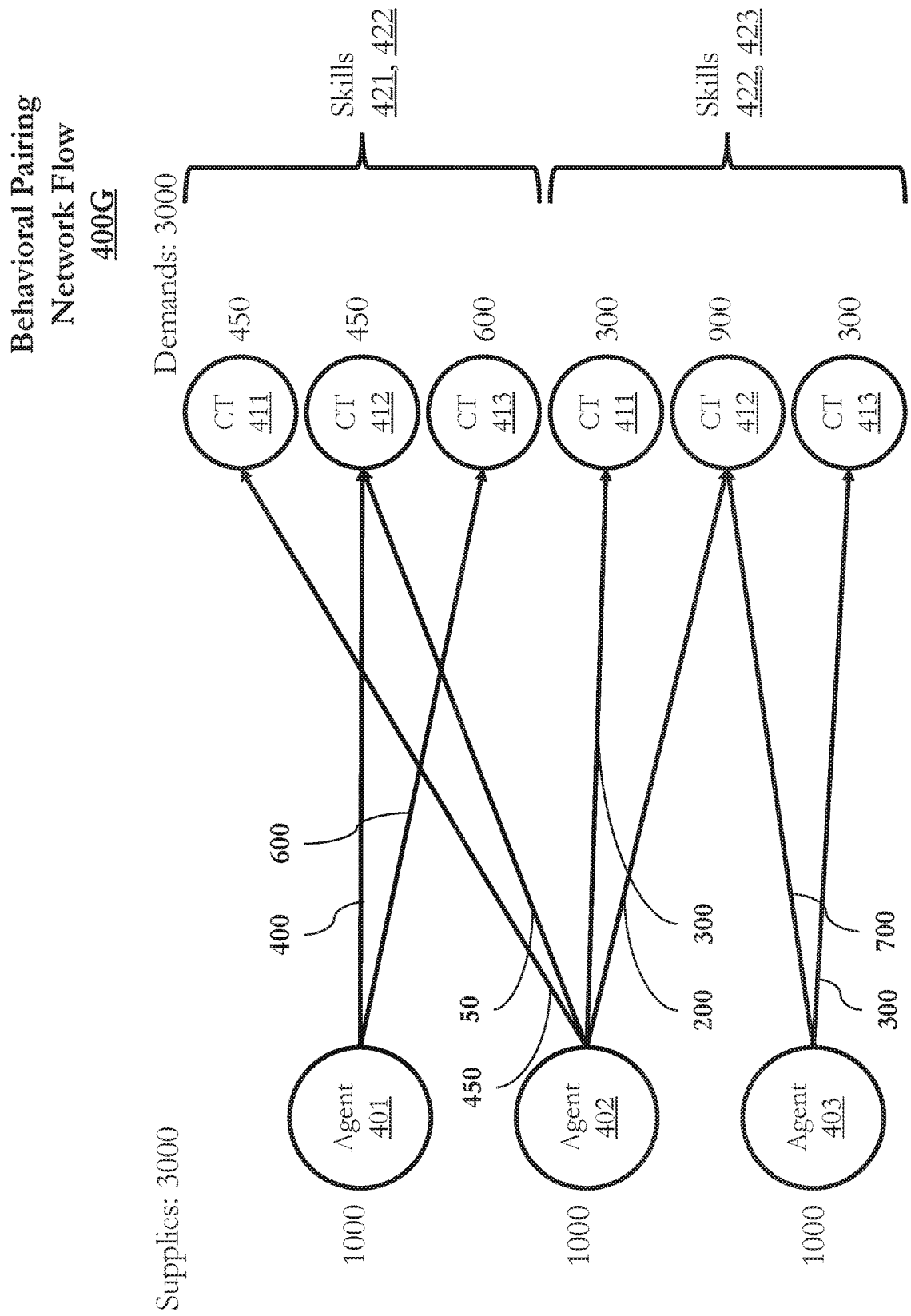
FIG. 4G shows an example of a BP network flow according to embodiments of the present disclosure.

FIG. 4G shows an example of a BP network flow 400G according to embodiments of the present disclosure. BP network flow 400G is identical to BP network flow 400F (FIG. 4F) except, for clarity, edges for which the optimal flow solution was determined to be 0 have been removed. Under a BP strategy, an agent will not be preferably paired with a contact type for which the optimal flow solution was determined to be 0, despite having complementary skills and a nonzero payout.

In this example, edges 401A, 402C, 402F, and 403A have been removed. The remaining edges represent preferred pairings. Thus, in an L1 (agent surplus) environment, when a contact arrives, it may be preferably paired with one of the agents for which there is a preferred pairing available. For example, a contact of Contact Type 411 with Skills 421 and 422 may always be preferably paired with Agent 402, demanding 450 units of Agent 402's total supply (availability). For another example, a contact of Contact Type 412 with Skills 421 and 422 may be preferably paired with Agent 401 some of the time and with Agent 402 some of the time. This contact has a total demand of 450 (based on the expected frequency that this type of contact/skill will arrive), and it demands 400 units of supply from Agent 401, and the remaining 50 units of supply from Agent 402.

In some embodiments, when this contact of type/skill arrives, the BP module or similar component may select either Agent 401 or 402 according to the relative demands (400 and 50) made of each agent. For example, a pseudo-random number generator may be used to select Agent 401 or 402 randomly, with the random selection weighted according to the relative demands. Thus, for each contact of this type/skill, there is a $400/450$ ($\approx$89%) chance of selecting Agent 401 as the preferred pairing, and $50/450$ ($\approx$11%) chance of selecting Agent 402 as the preferred pairing. Over time, as many contacts of this type/skill have been paired using the BP strategy, approximately 89% of them may have been preferably paired to Agent 401, and the remaining 11% of them may have been preferably paired to Agent 402. In some embodiments, an agent's overall target utilization, or target utilization per contact type/skill, may be the agent's "bandwidth" for receiving a proportional percentage of contacts.

For this BP network flow 400G with this solution, the total supply from all of the agents is expected to meet the total demand from all of the contacts. Thus, the target utilization (here, a balanced utilization) of all agents may be achieved, while also achieving a higher expected overall performance in the contact center system according to the payouts and the relative allocations of agents to contacts along the edges with those payouts.

FIGS. 5A-I show an example of another BP payout matrix and network flow. For some configurations of agents and contact types with various combinations of skills, it is possible that the optimal or max flow for a given BP network flow may not completely balance supply and demand. The present example is similar to the example of FIGS. 4A-4G, except this configuration of agents and contact types initially leads to an imbalanced supply and demand. In this simplified, hypothetical contact center, quadratic programming-based techniques for adjusting target utilization may be applied in conjunction with linear programming-based network flow optimization techniques to increase overall contact center performance while maintaining an optimally skewed utilization across agents and contacts to accommodate the imbalanced configuration of agents and contact types.

FIG. 5A depicts an example of a BP skill-based payout matrix 500A according to embodiments of the present disclosure. The hypothetical contact center system represented in BP skill-based payout matrix 500A is similar to the contact center system represented in BP skill-based payout matrix 400A (FIG. 4) insofar as there are three agents (Agents 501, 502, and 503) having an initial expected availability/utilization of approximately one-third or 0.33 each. There are two contact types (Contact Types 511 and 512) having an expected frequency/utilization of approximately 40% (0.30+0.10) and 60% (0.30+0.30), respectively.

In the present example, Agent 501 has been assigned, trained, or otherwise made available to Skills 521 and 522, and Agents 502 and 503 to Skill 522 only. For example, if Skill 521 represented a French language skill, and Skill 522 represented a German language skill, Agent 501 could be assigned to contacts requiring either French or German, whereas Agents 502 and 503 could be assigned only to contacts requiring German and not to contacts requiring French.

In the present example, 0.30 or 30% of contacts are expected to be of Contact Type 511 and require Skill 521; 0.30 or 30% of contacts are expected to be of Contact Type 512 and require Skill 521; 0.10 or 10% of contacts are expected to be of Contact Type 511 and require Skill 522; and 0.30 or 30% of contacts are expected to be of Contact Type 512 and require Skill 522.

In the present example, Agent 501 may be paired with any contact (with payouts 0.30, 0.28, 0.30, and 0.28, as shown in BP skill-based payout matrix 500A). Agents 502 and 503, which have Skill 522 only, may be paired with contacts of either Contact Type 511 and 512 when they require at least Skill 522 (with payouts 0.30, 0.24, 0.25, and 0.20, as shown in BP skill-based payout matrix 500A). As indicated by the empty cells in BP skill-based payout matrix 500A, Agents 502 and 503 would not be paired with contacts requiring only Skill 521. The 12-cell payout matrix includes 4 empty cells, and the 8 non-empty cells represent 8 possible pairings.

Figure 5B:
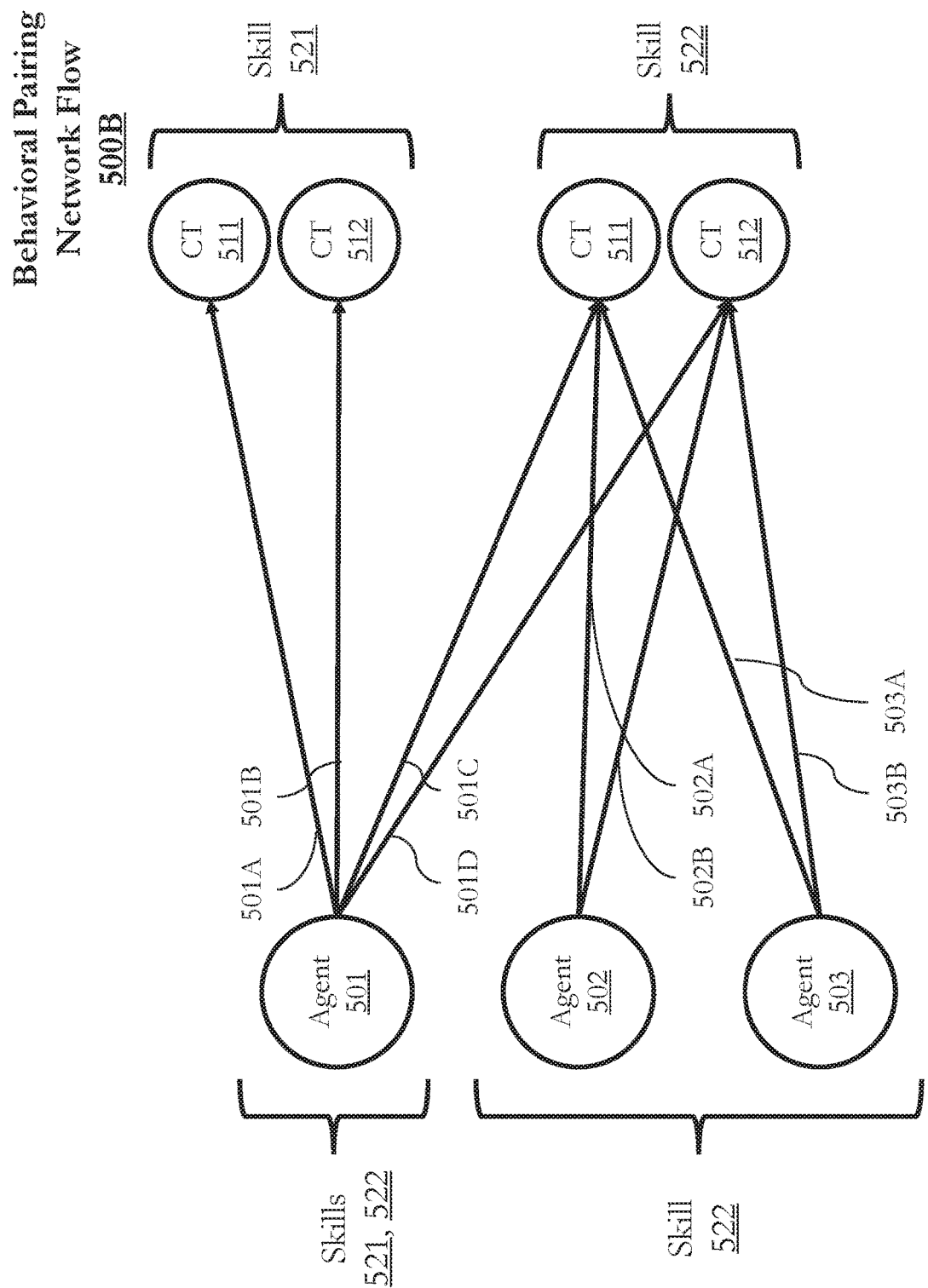
FIG. 5B shows an example of a BP network flow according to embodiments of the present disclosure.

FIG. 5B shows an example of a BP network flow 500B according to embodiments of the present disclosure. Similar to BP network flow 400B (FIG. 4B), BP network flow 500B shows Agents 501-503 as sources on the left side of the network and Contact Types 512 and 5123 for each skill set as sinks on the right side of the network. Each edge in BP network flow 500B represents a possible pairing between an agent and a contact having a particular type and set of needs (skills). Edges 501A-D, 502A-B, and 503A-B represent the possible contact-agent pairings for their respective agents and contact types/skills as shown.

Figure 5C:
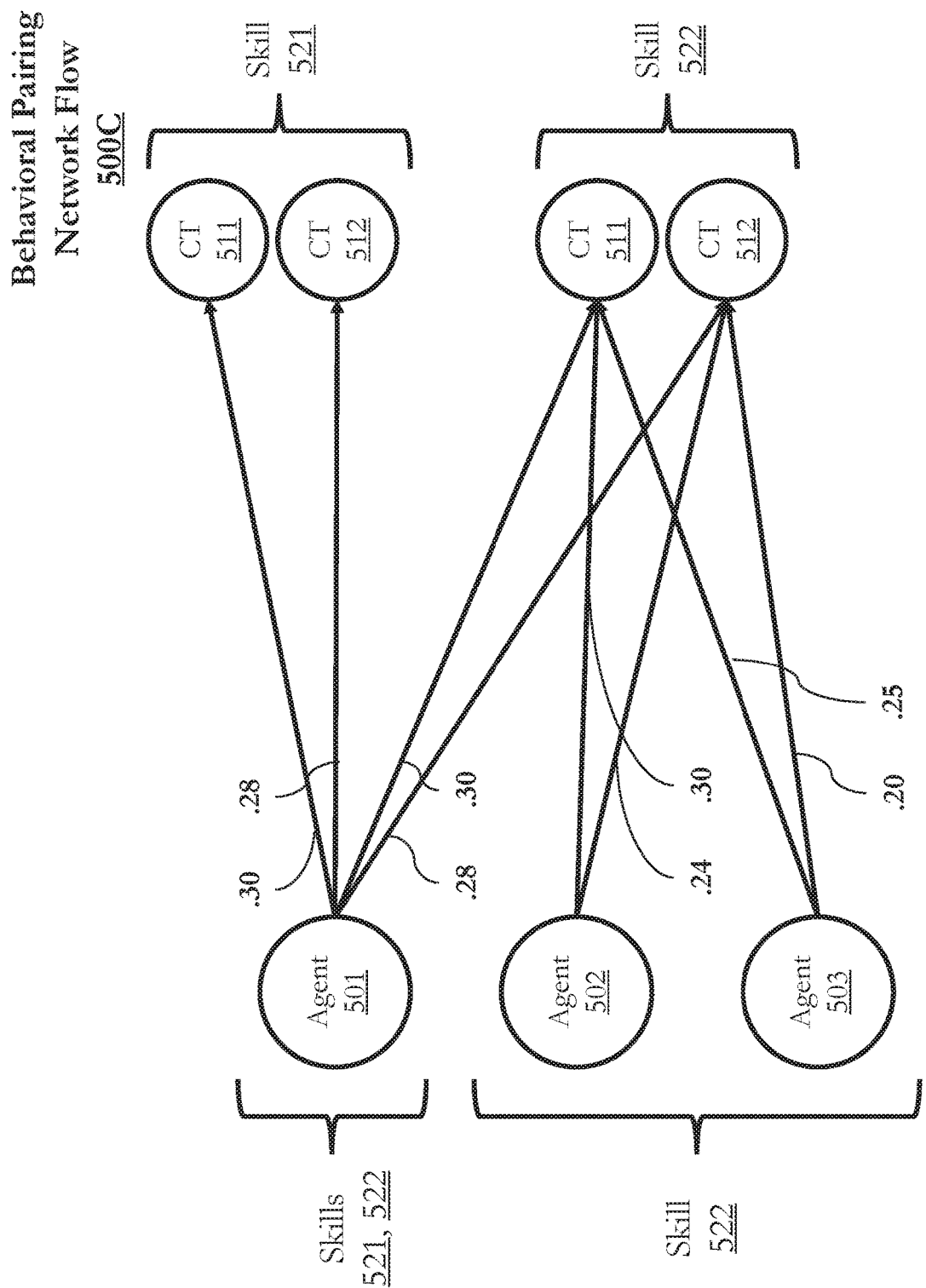
FIG. 5C shows an example of a BP network flow according to embodiments of the present disclosure.

FIG. 5C shows an example of a BP network flow 500C according to embodiments of the present disclosure. BP network flow 500C is a network representation of BP payout matrix 500A (FIG. 5A). For clarity, the identifiers for each edge are not shown, and instead it shows the payout for each edge, e.g., 0.30 on edges 501A and 501D, and 0.28 on edges 501B and 501C, and the corresponding payouts for each edge for Agents 502 and 503.

Figure 5D:
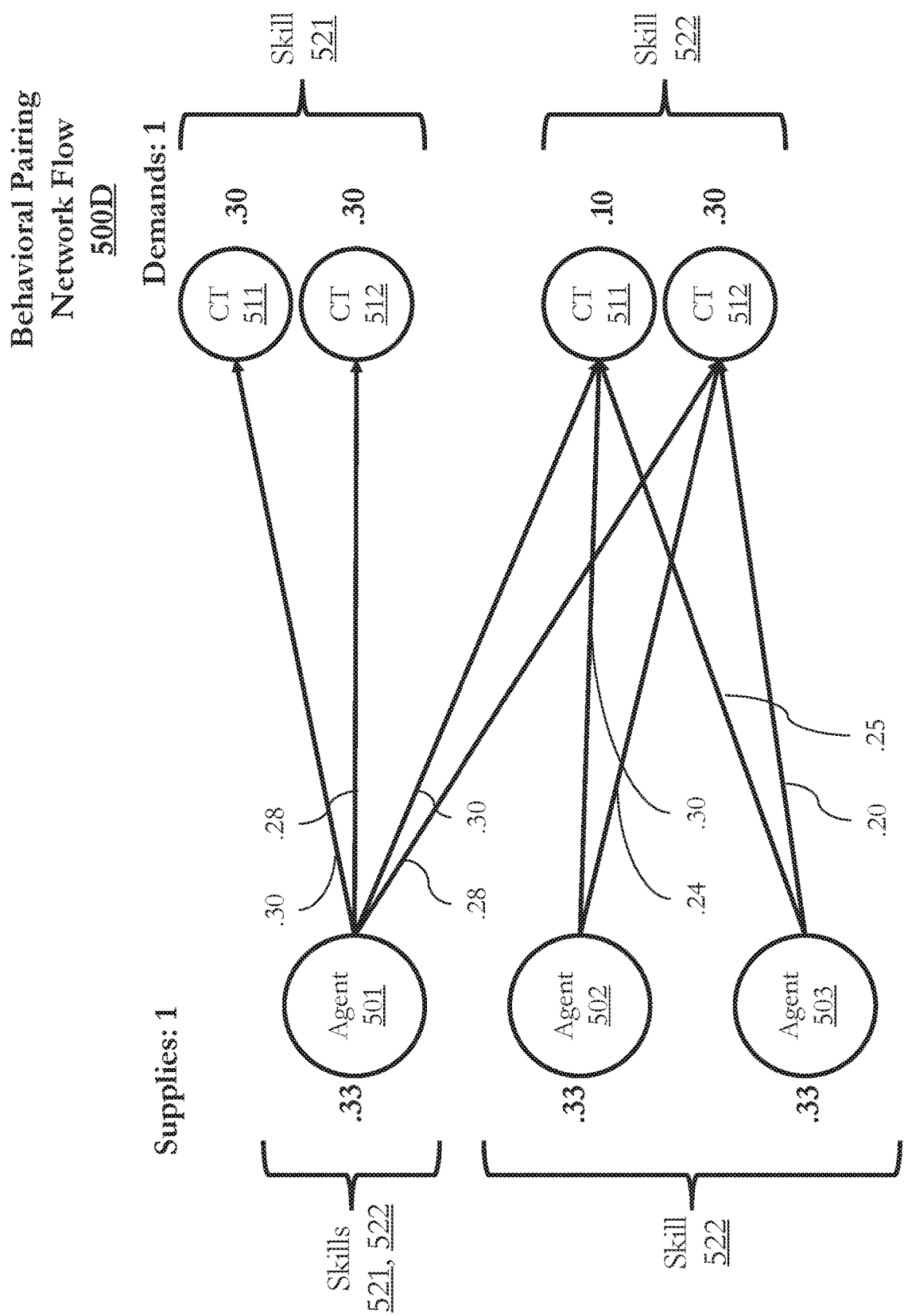
FIG. 5D shows an example of a BP network flow according to embodiments of the present disclosure.

FIG. 5D shows an example of a BP network flow 500D according to embodiments of the present disclosure. BP network flow 500D shows the relative initial supplies provided by each agent and demands required by each contact type/skill combination. The total supply of 1 equals the total demand of 1.

Figure 5E:
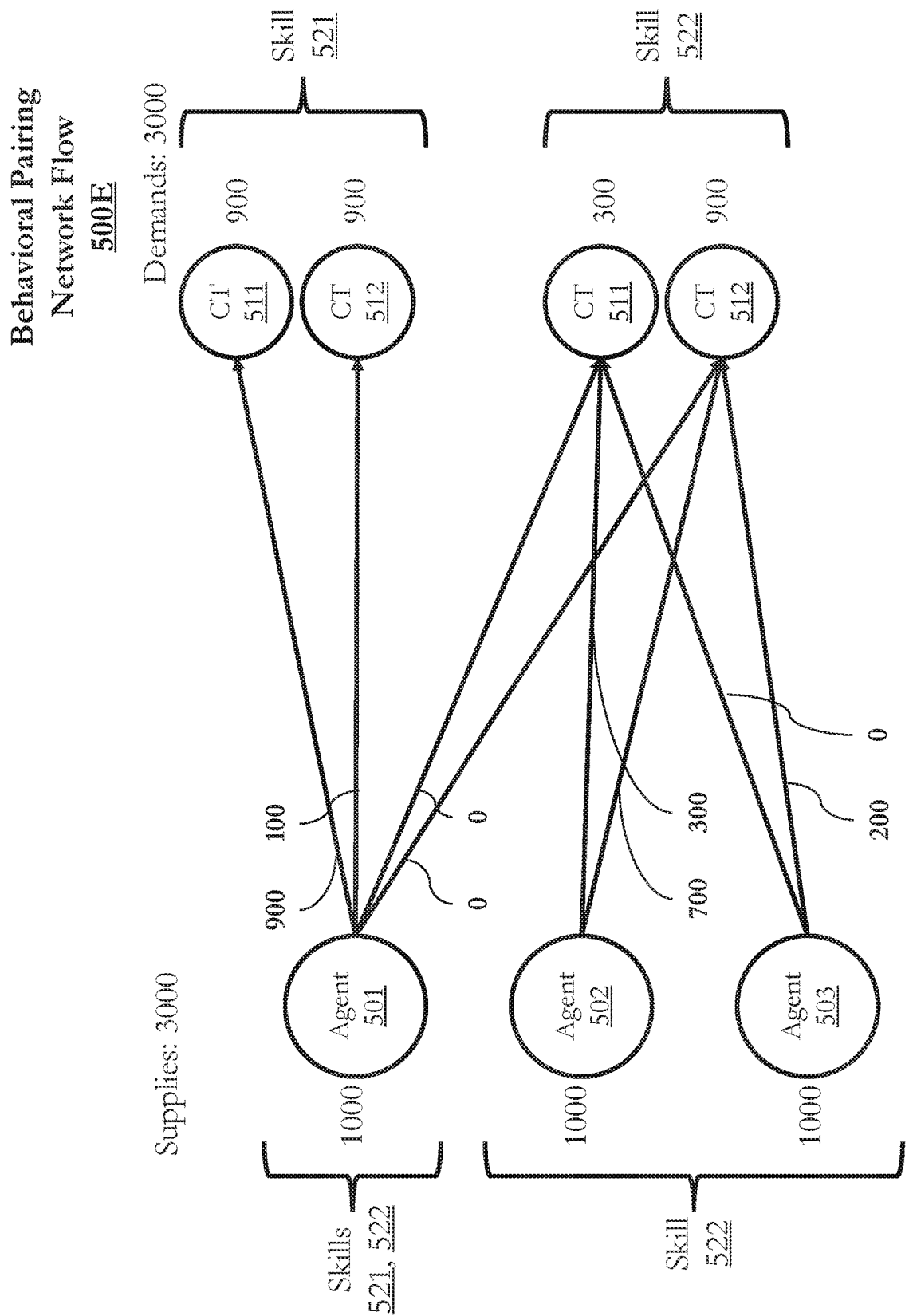
FIG. 5E shows an example of a BP network flow according to embodiments of the present disclosure.

FIG. 5E shows an example of a BP network flow 500E according to embodiments of the present disclosure. For ease of representation, the supplies and demands have been scaled by a factor of 3000, and a max flow solution for the initial supplies is shown for each edge. According to this solution, edge 501A (from Agent 501 to Contact Type 511 with Skill 521) has an optimal flow of 900; edge 501B (from Agent 501 to Contact Type 512 with Skill 521) has an optimal flow of 100; and edges 501C and 501D have optimal flows of 0. Similarly, the optimal flows for Agent 502 are 300 and 700, respectively; and the optimal flows for Agent 503 are 0 and 200, respectively.

According to this solution, Agent 503 may be substantially underutilized relative to Agents 501 and 502. Whereas Agents 501 and 502 are optimized for their full supplies of 1000 units each, Agent 503 is only expected to use 200 units, or one-fifth of Agent 503's supply. In a contact center environment, Agent 503 may be assigned to fewer contacts and spend more time idle relative to Agents 501 and 502, or agents may be assigned non-preferred contacts, resulting in a lower contact center performance than the performance predicted by the max flow solution.

Similarly, according to this solution, contacts of Contact Type 512 requiring Skill 521 may be substantially underutilized (or "underserved") relative to the other contact type/skill combinations. Whereas the other contact type/skill combinations are optimized for their full demands of 900, 300, and 900 units, respectively, Contact Type 512 requiring Skill 521 is only expected to receive 100 units, or one-ninth of this contact type/skill's demand. In a contact center environment, this underutilized contact type/skill combination may experience longer wait times relative to other contact type/skill combinations, or contacts may be assigned to non-preferred agents, resulting in a lower contact center performance than the performance predicted by the max flow solution.

The solution shown in BP network flow 500E still balances total supply and demand, but Agent 503 may be selected much less frequently than its peers, and/or some contacts may need to wait much longer for a preferred agent, and/or the overall contact center performance may not achieve the overall payout expected by the max flow solution.

Figure 5F:
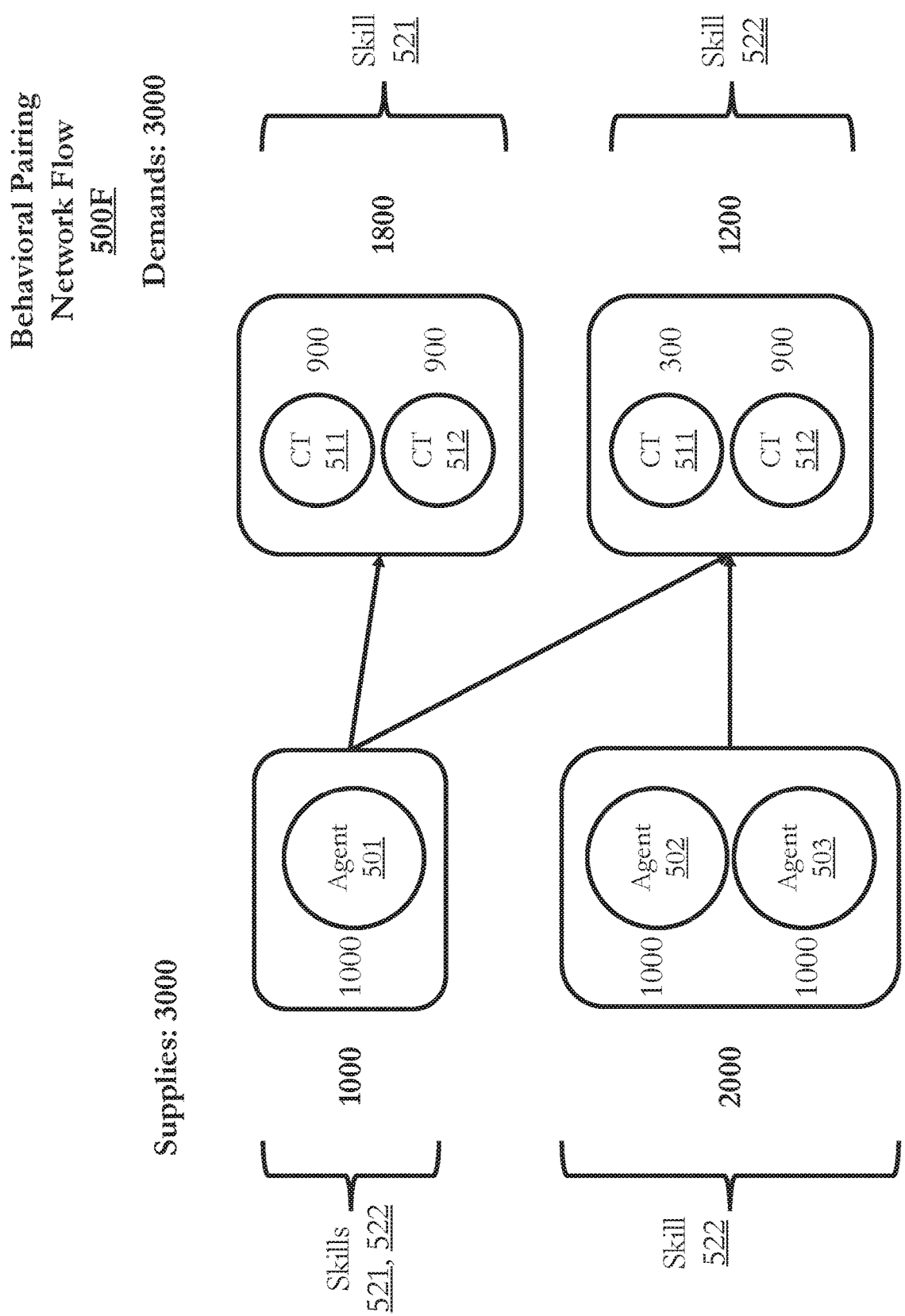
FIG. 5F shows an example of a BP network flow according to embodiments of the present disclosure.
Figure 5G:
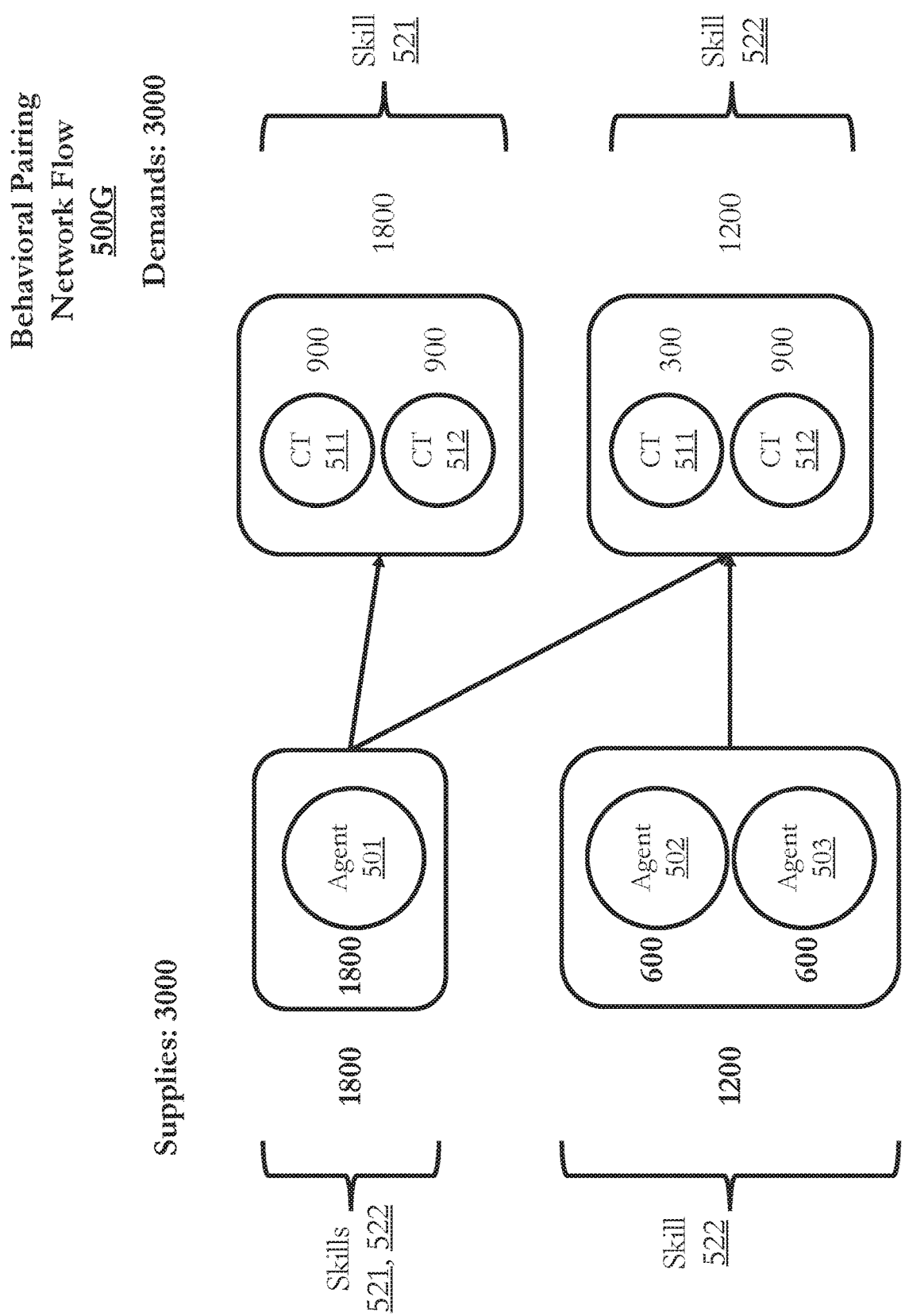
FIG. 5G shows an example of a BP network flow according to embodiments of the present disclosure.

FIGS. 5F and 5G show a technique of some embodiments for adjusting relative agent supplies to improve the balance of agent and contact utilization in a contact center system where the max flow solution is unbalanced, as in BP network flow 500E (FIG. 5E).

FIG. 5F shows an example of a BP network flow 500F according to embodiments of the present disclosure. In BP network flow 500F, agents sharing the same skill sets have been "collapsed" into a single network node. In this example, Agent 502 and Agent 503 have been combined into a single node for Skill 522 with a combined total supply of 2000.

Similarly, contact types sharing the same skill sets have been collapsed into single network nodes. In this example, Contact Types 511 and 512 requiring Skill 521 have been combined into a single node for Skill 521 with a combined total demand of 1800, and Contact Types 511 and 512 requiring Skill 522 have been combined into a single node for Skill 522 with a combined total demand of 1200.

Furthermore, the edges have been collapsed. For example, the four edges emanating from Agents 502 and 503 (edges 502A, 502B, 503A, and 503B as labeled in FIG. 5B) have been collapsed into a single edge emanating from the "super node" for agents having Skill 522 to the super node" for contact types requiring Skill 522.

At this point, in some embodiments, a quadratic programming algorithm or similar technique may be applied to the collapsed network to adjust the relative supplies of the agents.

FIG. 5G shows an example of a BP network flow 500G according to embodiments of the present disclosure. BP network flow 500G shows the adjusted agent supplies according to a solution to a quadratic programming algorithm or similar technique. In this example, the supply for the agent super node for Skills 521 and 522 has been adjusted from 1000 in BP network flow 500F (FIG. 5F) to 1800, and the supply for the agent super node for Skill 522 has been adjusted from 2000 in BP network flow 500F to 1200.

The total supply may remain the same (e.g., 3000 in this example), but the relative supplies for agents of various skill sets has been adjusted. In some embodiments, the total supply for a single super node may be distributed evenly among the agents within the super node. In this example, the 1200 units of supply for the agent super node for Skill 522 has been divided evenly among the agents, allocating 600 units to each of Agents 502 and 503.

Figure 5H:
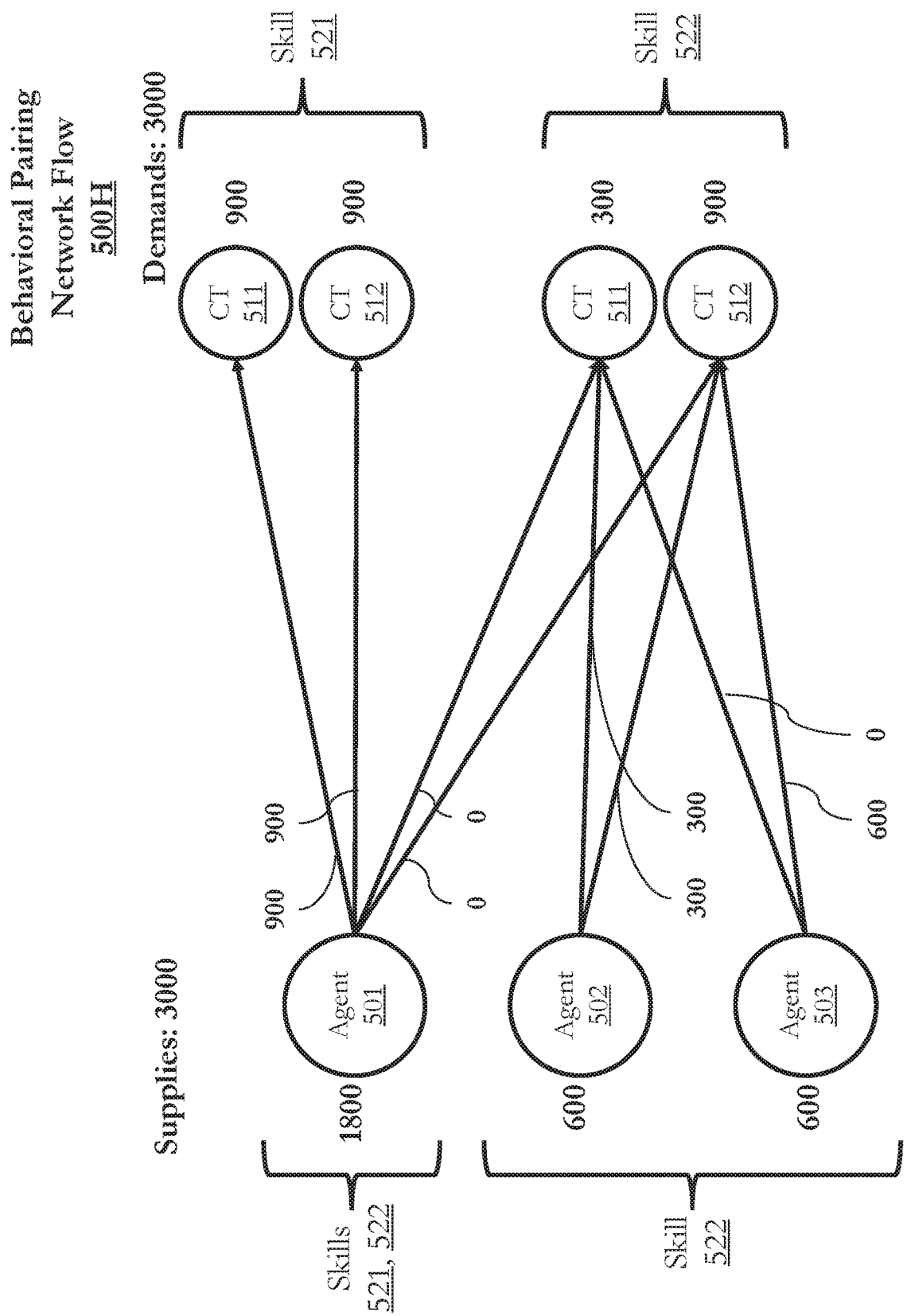
FIG. 5H shows an example of a BP network flow according to embodiments of the present disclosure.

FIG. 5H shows an example of a BP network flow 500H according to embodiments of the present disclosure. BP network flow 500H shows a max flow solution computed using the adjusted supplies shown in BP network flow 500G (FIG. 5G). Agent 501 has an adjusted supply of 1800, Agent 502 has an adjusted supply of 600, and Agent 503 has an adjusted supply of 600. According to this solution, edge 501A (from Agent 501 to Contact Type 511 with Skill 521) still has an optimal flow of 900; edge 501B (from Agent 501 to Contact Type 512 with Skill 521) now has an optimal flow of 900; and edges 501C and 501D still have optimal flows of 0. Similarly, the optimal flows for Agent 502 are now 300 and 300 each; and the optimal flows for Agent 503 are now 0 and 600, respectively.

Figure 5I:
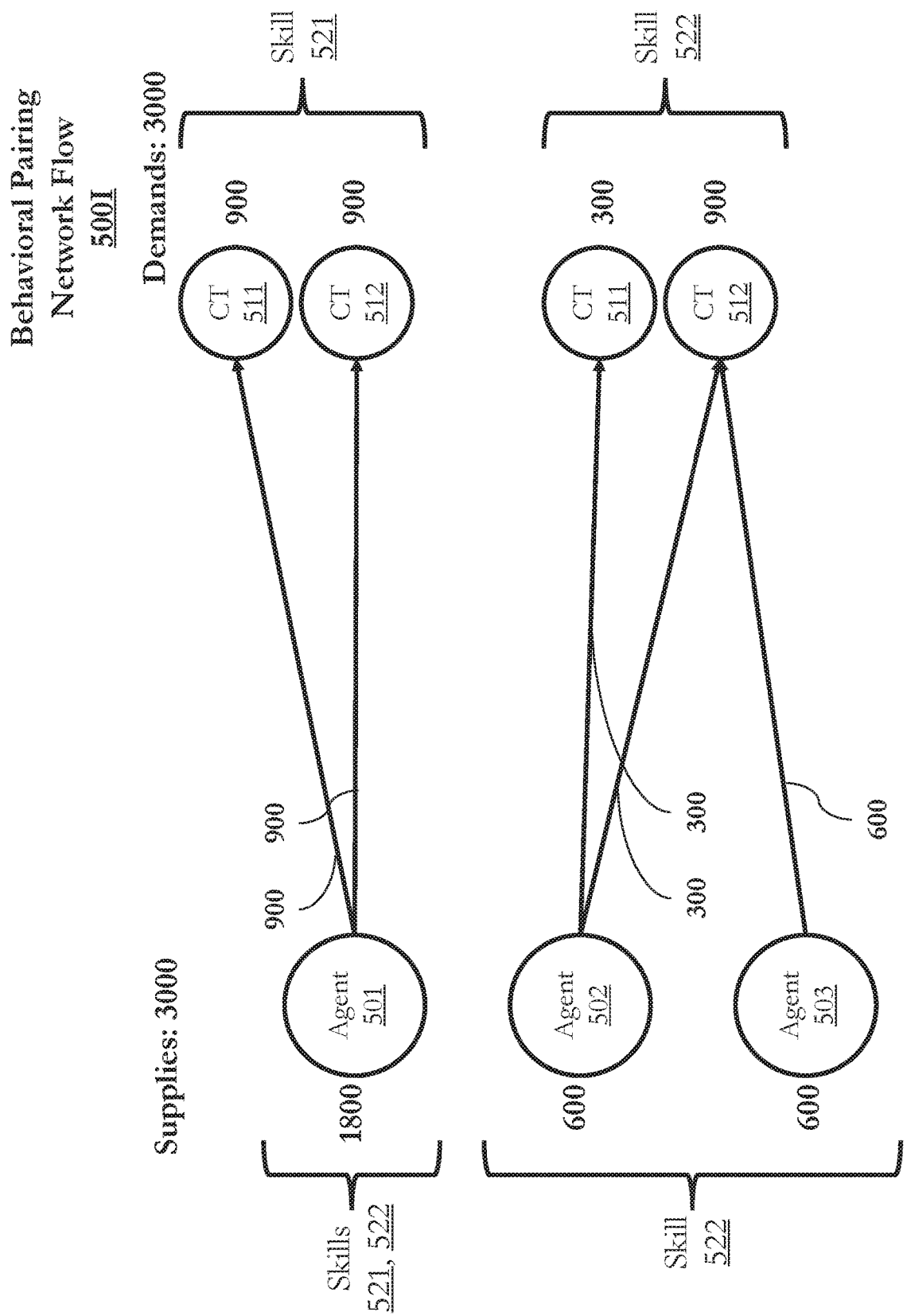
FIG. 5I shows an example of a BP network flow according to embodiments of the present disclosure.

FIG. 5I shows an example of a BP network flow 500I according to embodiments of the present disclosure. BP network flow 500I is identical to BP network flow 500H except, for clarity, edges for which the optimal flow solution was determined to be 0 have been removed. In this example, edges 501C, 501D, and 503A have been removed.

Using the solution shown in BP network flows 500H and 500I, now all contact type/skill combinations may be fully utilized (fully served).

Additionally, overall agent utilization may become more balanced. Under BP network flow 500E (FIG. 5E), Agent 503 may have only been utilized one-fifth as much as Agents 501 and 502. Thus, Agents 501 and 502 would have been assigned approximately 45% of the contacts each, while Agent 503 would have been assigned only the remaining approximately 10% of the contacts. Under BP network flow 500H, Agent 501 may be assigned approximately 60% of the contacts, and Agents 502 and 503 may be assigned approximately 20% each of the remaining contacts. In this example, the busiest agent (Agent 501) would only receive three times as many contacts as the least busy agents (Agents 502 and 503), instead of receiving five times as many contacts.

Figure 6:
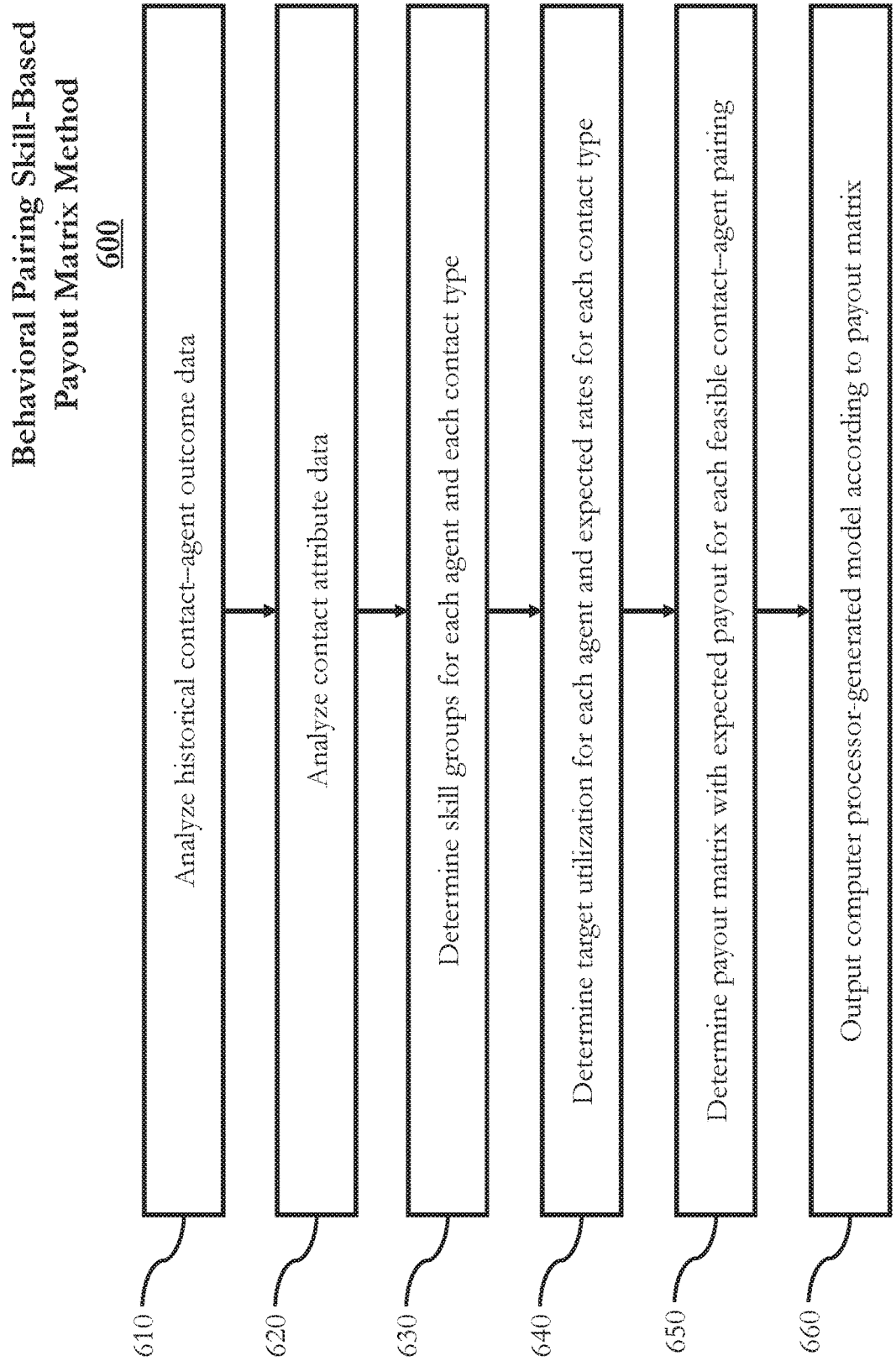
FIG. 6 depicts a flow diagram of a BP skill-based payout matrix method according to embodiments of the present disclosure.

FIG. 6 depicts a flow diagram of a BP skill-based payout matrix method 600 according to embodiments of the present disclosure. BP skill-based payout matrix method 600 may begin at block 610.

At block 610, historical contact-agent outcome data may be analyzed. In some embodiments, a rolling window of historical contact-agent outcome data may be analyzed, such as a one-week, one-month, ninety-day, or one-year window. Historical contact-agent outcome data may include information about individual interactions between a contact and an agent, including identifiers of which agent communicated with which contact, when the communication took place, the duration of the communication, and the outcome of the communication. For example, in a telesales call center, the outcome may indicate whether a sale occurred or the dollar amount of a sale, if any. In a customer retention queue, the outcome may indicate whether a customer was retained (or "saved") or the dollar value of any incentive offered to retain the customer. In a customer service queue, the outcome may indicate whether the customer's needs were met or problems were solved, or a score (e.g., Net Promoter Score or NPS) or other rating representative of the customer's satisfaction with the contact-agent interaction. After—or in parallel with—analyzing historical contact-agent outcome data, BP skill-based payout matrix method 600 may proceed to block 620.

At block 620, contact attribute data may be analyzed. Contact attribute data may include data stored in one or more customer relationship management (CRM) databases. For example, a wireless telecommunication provider's CRM database may include information about the type of cellphone a customer uses, the type of contract the customer signed up for, the duration of the customer's contract, the monthly price of the customer's contract, and the tenure of the customer's relationship with the company. For another example, a bank's CRM database may include information about the type and number of accounts held by the customer, the average monthly balance of the customer's accounts, and the tenure of the customer's relationship with the company. In some embodiments, contact attribute data may also include third party data stored in one or more databases obtained from a third party. After—or in parallel with— analyzing contact attribute data, BP skill-based payout matrix method 600 may proceed to block 630.

At block 630, skill groups may be determined for each agent and each contact type. Examples of skills include broad skills such as technical support, billing support, sales, retention, etc.; language skills such as English, Spanish, French, etc.; narrower skills such as "Level 2 Advanced Technical Support," technical support for Apple iPhone users, technical support for Google Android users, etc.; and any variety of other skills. In some embodiments, there may not be any distinctive skills, or only one skill may be identified across all of the agents or all of the contact types. In these embodiments, there may be only a single "skill group."

In some embodiments, a given contact type may require different skill sets at different times. For example, during a first call to a call center, a contact of one type might have a technical question and require an agent with a technical support skill, but during a second call, the same contact of the same type might have a billing question and require an agent with a customer support skill. In these embodiments, the same contact type may be included more than once according to each contact type/skill combination. After skill groups have been determined, BP skill-based payout matrix method 600 may proceed to block 640.

At block 640, a target utilization may be determined for each agent, and an expected rate may be determined for each contact type (or contact type/skill combinations). In some L1 environments, a balanced agent utilization may be targeted, such that each agent is expected to be assigned an approximately equal number of contacts over time. For example, if a contact center environment has four agents, each agent may have a target utilization of ¼ (or 25%). As another example, if a contact center environment has n agents, each agent may have a target utilization of 1/n (or the equivalent percentage of contacts).

Similarly, expected rates for each contact type/skill may be determined based, for example, on the actual rates observed in the historical contact-agent outcome data analyzed at block 610. After target utilization and expected rates have been determined, BP skill-based payout matrix method 600 may proceed to block 650.

At block 650, a payout matrix with expected payouts for each feasible contact-agent pairing may be determined. In some embodiments, a contact-agent pairing may be feasible if an agent and contact type have at least one skill in common. In other embodiments, a contact-agent pairing may be feasible if an agent has at least all of the skills required by the contact type. In yet other embodiments, other heuristics for feasibility may be used.

An example of a payout matrix is BP skill-based payout matrix 400A, described in detail above with reference to FIG. 4A. BP skill-based payout matrix 400A includes a set of agents with associated skills and target utilizations, a set of contact types (combined with various skill sets) with expected frequencies determined based on historical contact-agent outcome data and/or contact attribute data, and a set of non-zero expected payouts for each feasible contact-agent pairing. After the payout matrix has been determined, BP skill-based payout matrix method 600 may proceed to block 660.

At block 660 a computer processor-generated model according to the payout matrix may be outputted. For example, a computer processor embedded within or communicatively coupled to the contact center system or a component therein such as a BP module may output the payout matrix model to be received by another component of the computer processor or the contact center system. In some embodiments, the payout matrix model may be logged, printed, displayed, transmitted, or otherwise stored for other components or human administrators of the contact center system. After the payout matrix model has been outputted, BP skill-based payout matrix method 600 may end.

Figure 7A:
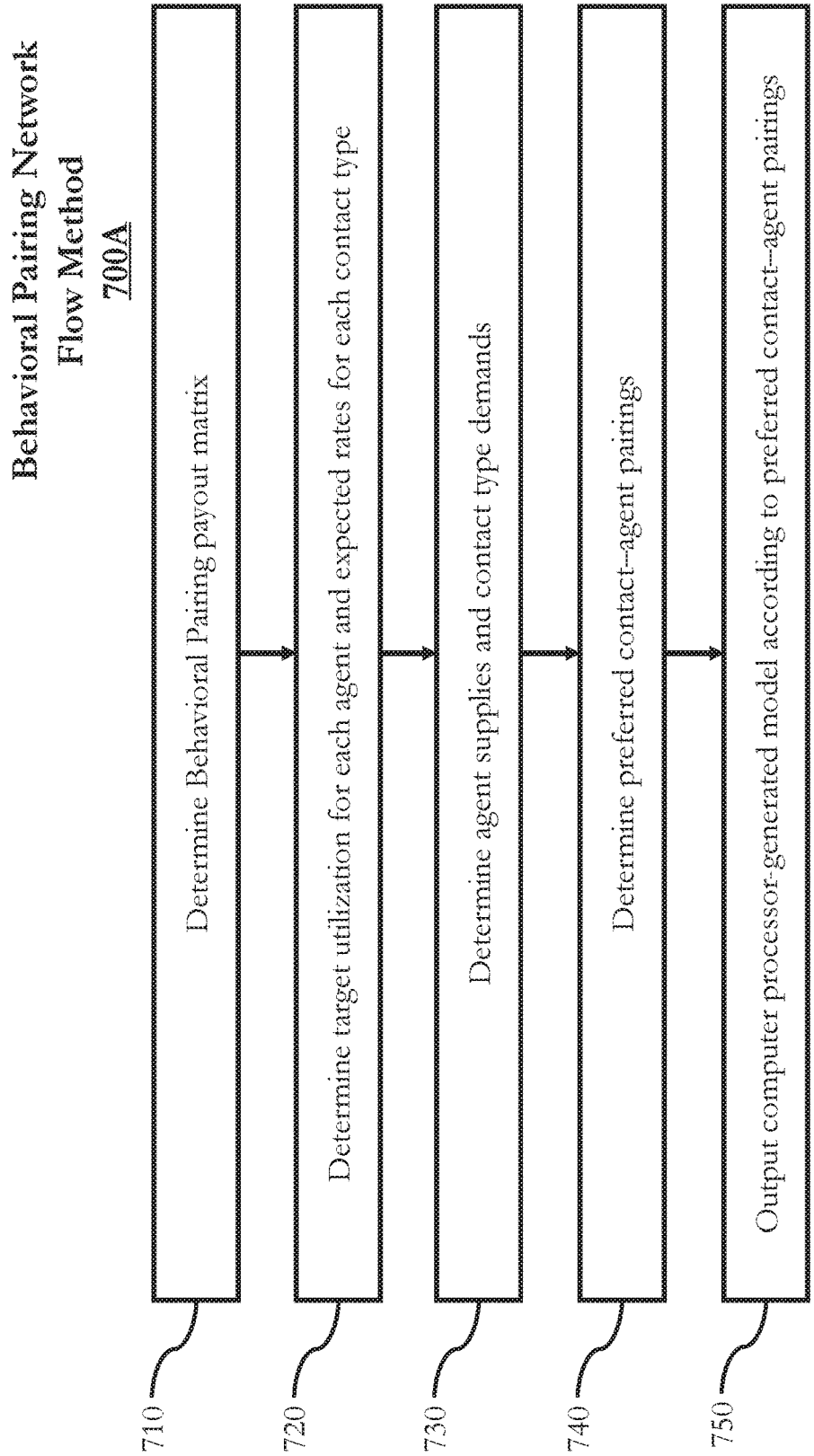
FIG. 7A shows a flow diagram of a BP network flow method according to embodiments of the present disclosure.

FIG. 7A shows a flow diagram of a BP network flow method 700A according to embodiments of the present disclosure. BP network flow method 700A may begin at block 710.

At block 710, a BP payout matrix may be determined. In some embodiments, the BP payout matrix may be determined using BP payout matrix method 600 or similar methods. In other embodiments, the BP payout matrix may be received from another component or module. After the BP payout matrix has been determined, BP network flow method 700A may proceed to block 720.

At block 720, a target utilization may be determined for each agent and expected rates may be determined for each contact type. In other embodiments, the payout matrix determined at block 710 may incorporate or otherwise include target utilizations and/or expected rates, such as a payout matrix outputted by BP payout matrix method 600, or BP skill-based payout matrix 400A (FIG. 4A). After target utilizations and expected rates have been determined, if necessary, BP network flow method 700A may proceed to block 730.

At block 730, agent supplies and contact type demands may be determined. As described in detail above with reference to, for example, FIGS. 4D and 4E, each agent may provide a "supply" equivalent to the expected availability or target utilization of each agent (e.g., in an environment with three agents, one-third each, for a total supply of 1 or 100%). Additionally, each contact type/skill may demand an amount of agent supply equivalent to the expected frequency or target utilization of each contact type/skill, for a total demand of 1 or 100%. The total supply and demand may be normalized or otherwise configured to equal one another, and the capacity or bandwidth along each edge may be considered infinite or otherwise unlimited. In other embodiments, there may be a supply/demand imbalance, or there may be quotas or otherwise limited capacities set for some or all edges.

In some embodiments, the supplies and demands may be scaled by some factor, e.g., 1000, 3000, etc. In doing so, the supply for each of three agents may be shown to be 1000 instead of one-third, and the total supply may be shown to be 3000. Similarly, the relative demands for each contact type/skill set may be scaled. In some embodiments, no scaling occurs. After agent supplies and contact type demands have been determined, BP network flow method 700A may proceed to block 740.

At block 740, preferred contact-agent pairings may be determined. As described in detail above with reference to, for example, FIGS. 4F and 4G, one or more solutions for the BP network flow may be determined. In some embodiments, a "maximum flow" or "max flow" algorithm, or other linear programming algorithm, may be applied to the BP network flow to determine one or more solutions for optimizing the "flow" or "allocation" of the supplies (sources) to satisfy the demands (sinks). In some embodiments, a "max cost" algorithm may be applied to select an optimal max flow solution.

In some contact center environments, such as an L2 (contact surplus) environment, the network flow may be reversed, so that contacts waiting in queue are the sources providing supplies, and the possible agents that may become available are the sinks providing demands.

The BP network flow may include an optimal flow solution determined by a BP module or similar component. According to this solution, of which there could be several to choose among, or to be selected at random, some (feasible) edges may have an optimal flow of 0, indicating that such a feasible pairing is not a preferred pairing. In some embodiments, the BP network flow may remove edges representing feasible pairings if the pairing is determined to not be a preferred pairing.

Other edges may have a non-zero optimal flow, indicating that such a feasible pairing is preferred at least some of the time. As explained in detail above, this optimal flow solution describes the relative proportion of contact-agent interactions (or the relative likelihoods of selecting particular contact-agent interactions) that will achieve the target utilization of agents and contacts while also maximizing the expected overall performance of the contact center system according to the payouts for each pair of agent and contact type/skill set.

For some solutions of some BP network flows, a single contact type/skill may have multiple edges flowing into it from multiple agents. In these environments, the contact type/skill may have multiple preferred pairings. Given a choice among multiple agents, the BP network flow indicates the relative proportion or weighting for which one of the several agents may be selected each time a contact of that contact type/skill arrives at the contact center. After determining preferred contact-agent pairings, BP network flow method 700A may proceed to block 750.

At block 750, a computer processor-generated model according to the preferred contact-agent pairings may be outputted. For example, a computer processor embedded within or communicatively coupled to the contact center system or a component therein such as a BP module may output the preferred pairings model to be received by another component of the computer processor or the contact center system. In some embodiments, the preferred pairings model may be logged, printed, displayed, transmitted, or otherwise stored for other components or human administrators of the contact center system. After the preferred pairings model has been outputted, BP network flow method 700A may end.

Figure 7B:
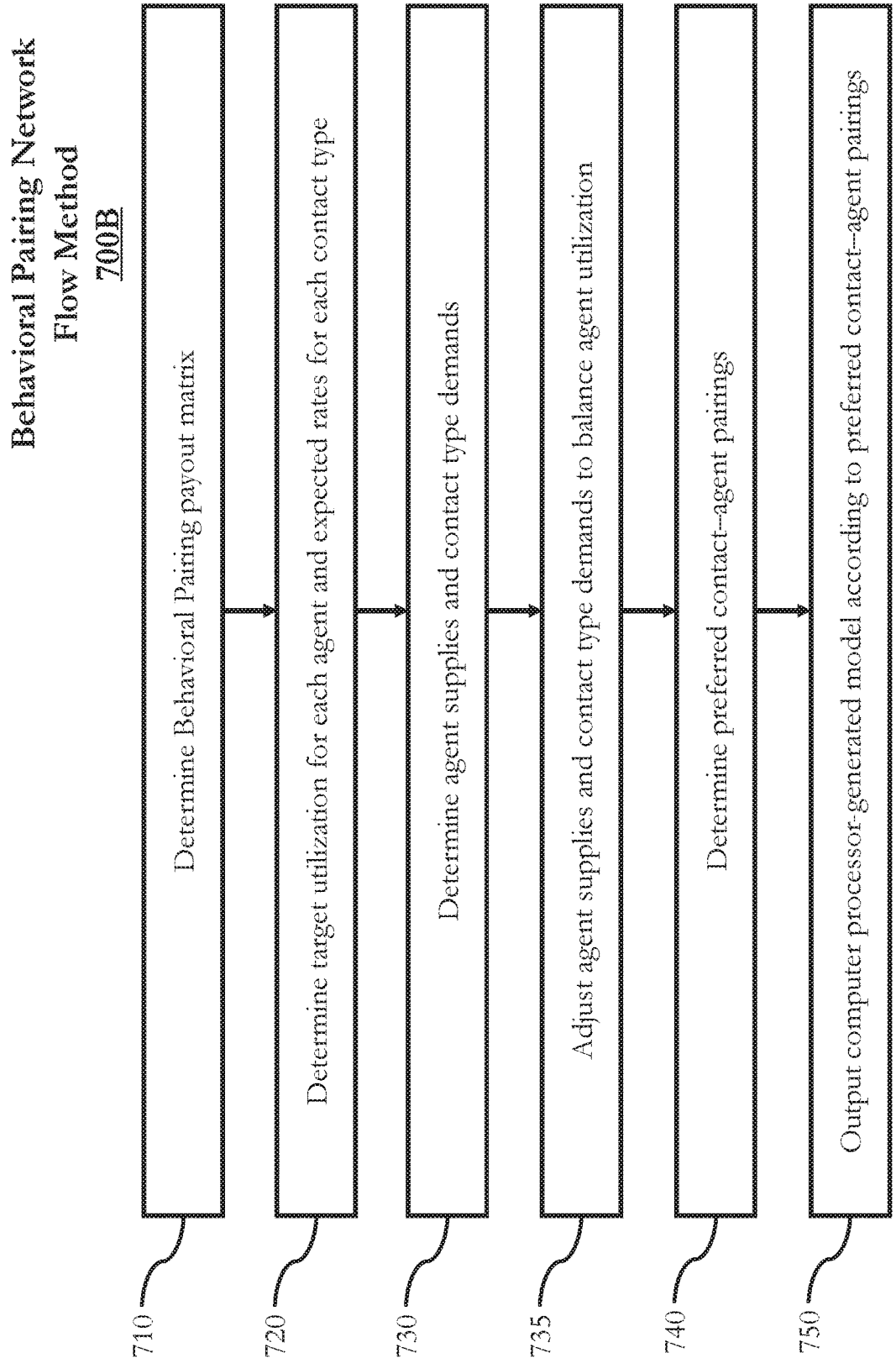
FIG. 7B shows a flow diagram of a BP network flow method according to embodiments of the present disclosure.

FIG. 7B shows a flow diagram of a BP network flow method 700B according to embodiments of the present disclosure. BP network flow 700B is similar to BP network flow 700A described above with reference to FIG. 7A. BP network flow method 700B may begin at block 710. At block 710, a BP payout matrix may be determined. After the BP payout matrix has been determined, BP payout matrix method 700B may proceed to block 720. At block 720, a target utilization may be determined for each agent and expected rates may be determined for each contact type. After target utilizations and expected rates have been determined, if necessary, BP network flow method 700B may proceed to block 730. At block 730, agent supplies and contact type demands may be determined. After agent supplies and contact type demands have been determined, BP network flow method 700B may proceed to block 735.

At block 735, agent supplies and/or contact demands may be adjusted to balance agent utilization, or to improve agent utilization balance. As described in detail above with reference to, for example, FIGS. 5F and 5G, agents sharing the same skill sets may be "collapsed" into single network nodes (or "super nodes"). Similarly, contact types sharing the same skill sets may be collapsed into single network nodes. Furthermore, the edges may be collapsed according to their corresponding super nodes. At this point, in some embodiments, a quadratic programming algorithm or similar technique may be applied to the collapsed network to adjust the relative supplies of the agents and/or the relative demands of the contacts. After adjusting agent supplies and/or contact demands to balance agent utilization, BP network flow method 700B may proceed to block 740.

At block 740, preferred contact-agent pairings may be determined. After determining preferred contact-agent pairings, BP network flow method 700A may proceed to block 750. At block 750, a computer processor-generated model according to the preferred contact-agent pairings may be outputted. After the preferred pairings model has been outputted, BP network flow method 700B may end.

Figure 8:
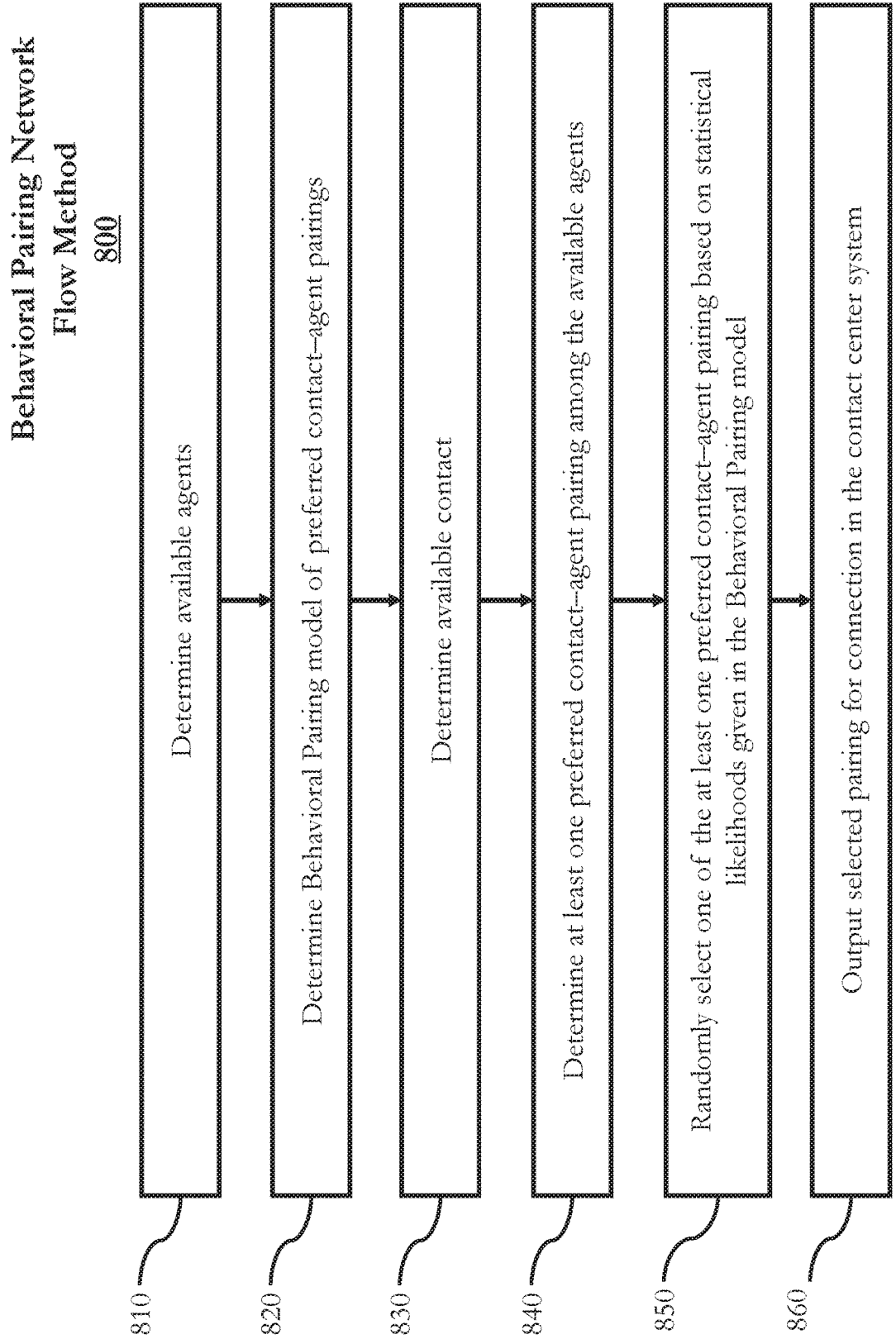
FIG. 8 shows a flow diagram of a BP network flow method according to embodiments of the present disclosure.

FIG. 8 shows a flow diagram of a BP network flow method 800 according to embodiments of the present disclosure. BP network flow method 800 may begin at block 810.

At block 810, available agents may be determined. In a real-world queue of a contact center system, there may be dozens, hundreds, or thousands of agents or more employed. At any given time, a fraction of these employed agents may be logged into the system or otherwise actively working on a shift. Also at any given time, a fraction of logged-in agents may be engaged in a contact interaction (e.g., on a call for a call center), logging the outcome of a recent contact interaction, taking a break, or otherwise unavailable to be assigned to incoming contacts. The remaining portion of logged-in agents may be idle or otherwise available to be assigned. After determining the set of available agents, BP network flow method 800 may proceed to block 820.

At block 820, a BP model of preferred contact-agent pairings may be determined. In some embodiments, the preferred pairings model may be determined using BP network flow method 700A (FIG. 7A) or 700B (FIG. 7B), or similar methods. In other embodiments, the preferred pairings model may be received from another component or module.

In some embodiments, the preferred pairings model may include all agents employed for the contact center queue or queues. In other embodiments, the preferred pairings model may include only those agents logged into the queue at a given time. In still other embodiments, the preferred pairings model may include only those agents determined to be available at block 810. For example, with reference to FIG. 4B, if Agent 403 is unavailable, some embodiments may use a different preferred pairings model that omits a node for Agent 403 and includes nodes only for available agents Agent 401 and Agent 402. In other embodiments, the preferred pairings model may include a node for Agent 403 but may be adapted to avoid generating a nonzero probability of assigning a contact to Agent 403. For example, the capacity of the flow from Agent 403 to each compatible contact type may be set to zero.

The preferred pairings model may be precomputed (e.g., retrieved from a cache or other storage) or computed in real-time or near real-time as agents become available or unavailable, and/or as contacts of various types with various skill needs arrive at the contact center. After the preferred pairings model has been determined, BP network flow method 800 may proceed to block 830.

At block 830, an available contact may be determined. For example, in an L1 environment, multiple agents are available and waiting for assignment to a contact, and the contact queue is empty. When a contact arrives at the contact center, the contact may be assigned to one of the available agents without waiting on hold. In some embodiments, the preferred pairings model determined at block 820 may be determined for the first time or updated after the determination of an available contact at block 830. For example, with reference to FIGS. 4A-4G, Agents 401-403 may be the three agents out of dozens or more that happen to be available at a given moment. At that time, BP skill-based payout matrix 400A (FIG. 4A) may be determined for the three instant available agents, and BP network flow 400G (FIG. 4G) may be determined for the three instant available agents based on the BP skill-based payout matrix 400A. Thus, the preferred pairings model may be determined at that time for those three available agents.

In some embodiments, the preferred pairings model may account for some or all of the expected contact type/skill combinations as in, for example, BP network flow 400G, even though the particular contact to be paired is already known to BP network flow method 800 because the contact has already been determined at block 830. After the available contact has been determined at block 830 (and the preferred pairings model has been generated or updated, in some embodiments), the BP network flow method 800 may proceed to block 840.

At block 840, at least one preferred contact-agent pairing among the available agents and the available contact may be determined. For example, as shown in BP network flow 400G (FIG. 4G), if the available contact is of Contact Type 411 and requires Skill 421 or 422, the preferred pairing is to Agent 402. Similarly, if the available contact is of Contact Type 412 and requires Skill 421 or 422, the preferred pairings are to either Agent 401 (optimal flow of 400) or Agent 402 (optimal flow of 50). After at least one preferred contact-agent pairing has been determined, BP network flow method 800 may proceed to block 850.

At block 850, one of the at least one preferred contact-agent pairings may be selected. In some embodiments, the selection may be at random, such as by using a pseudorandom number generator. The likelihood (or probability) of selecting a given one of the at least one preferred contact-agent pairings may be based on statistical likelihoods described by the BP model. For example, as shown in BP network flow 400G (FIG. 4G), if the available contact is of Contact Type 412 and requires Skill 421 or 422, the probability of selecting Agent 401 is $400/450 \approx 89\%$ chance, and the probability of selecting Agent 402 is $50/450 \approx 11\%$ chance.

If there is only one preferred contact-agent pairing, there may be no need for random selection in some embodiments as the selection may be trivial. For example, as shown in BP network flow 400G (FIG. 4G), if the available contact is of Contact Type 411 and requires Skill 421 or 422, the preferred pairing is always to Agent 402, and the probability of selecting Agent 402 is $450/450 = 100\%$ chance. After selecting one of the at least one preferred contact-agent pairings, BP network flow method 800 may proceed to block 860.

At block 860, the selected pairing may be outputted for connection in the contact center system. For example, a computer processor embedded within or communicatively coupled to the contact center system or a component therein such as a BP module may output the preferred pairing selection (or recommended pairing, or pairing instruction) to be received by another component of the computer processor or the contact center system. In some embodiments, the preferred pairing selection may be logged, printed, displayed, transmitted, or otherwise stored for other components or human administrators of the contact center system. The receiving component may use the preferred pairing selection to cause the selected agent to be connected to the contact for which a pairing was requested or otherwise determined. After the preferred pairing instruction has been outputted, BP network flow method 800 may end.

Figure 9:
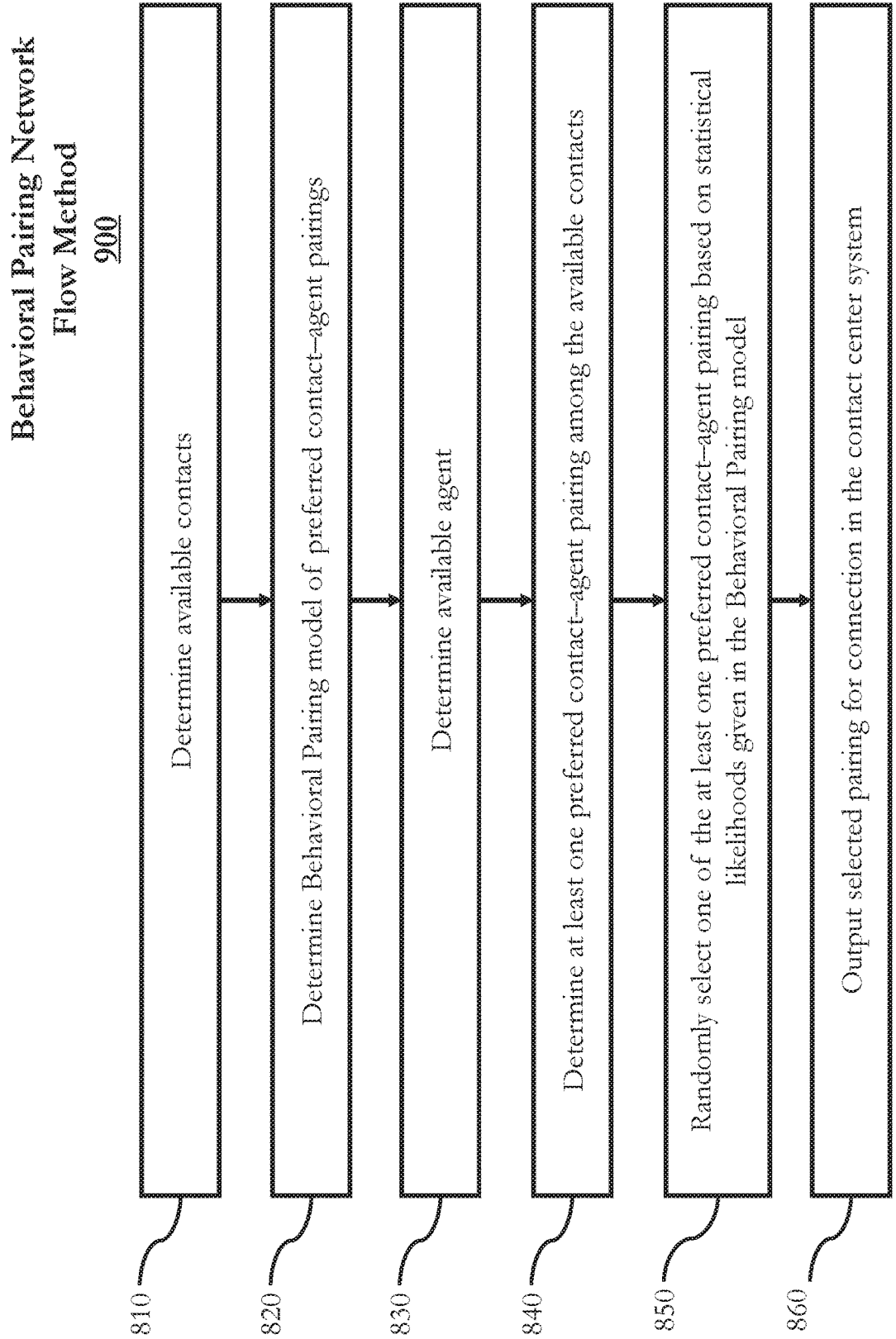
FIG. 9 shows a flow diagram of a BP network flow method according to embodiments of the present disclosure.

FIG. 9 shows a flow diagram of a BP network flow method 900 according to embodiments of the present disclosure. In some embodiments, BP network flow method 900 is similar to BP network flow method 800. Whereas BP network flow method 800 illustrates an L1 environment (agent surplus), BP network flow method 900 illustrates an L2 environment (contacts in queue). BP network flow method 900 may begin at block 910.

At block 910, available contacts may be determined. In a real-world queue of a contact center system, there may be dozens, hundreds, etc. of agents employed. In L2 environments, all logged-in agents are engaged in contact interactions or otherwise unavailable. As contacts arrive at the contact center, the contacts may be asked to wait in a hold queue. At a given time, there may be dozens or more contacts waiting on hold. In some embodiments, the queue may be ordered sequentially by arrival time, with the longest-waiting contact at the head of the queue. In other embodiments, the queue may be ordered at least in part based on a priority rating or status of individual contacts. For example, a contact designated as "high priority" may be positioned at or near the head of the queue, ahead of other "normal priority" contacts that have been waiting longer. After determining the set of available contacts waiting in queue, BP network flow method 900 may proceed to block 920.

At block 920, a BP model of preferred contact-agent pairings may be determined. In some embodiments, the preferred pairings model may be determined using a method similar to BP network flow method 700A (FIG. 7A) or 700B (FIG. 7B), insofar as the waiting contacts provide the sources of supply, and an agents that may become available provide the sinks of demand. In other embodiments, the preferred pairings model may be received from another component or module.

In some embodiments, the preferred pairings model may include all contact types expected to arrive at the contact center queue or queues. In other embodiments, the preferred pairings model may include only those contact type/skill combinations present and waiting in the queue at the time the model was requested. For example, consider a contact center system that expects to receive contacts of three types X, Y, and Z, but only contacts of types X and Y are presently waiting in the queue. Some embodiments may use a different preferred pairings model that omits a node for contact type Z, including nodes only for waiting contacts of types X and Y. In other embodiments, the preferred pairings model may include a node for contact type Z, but this model may be adapted to avoid generating a nonzero probability of assigning an agent to a contact of contact type Z. For example, the capacity of the flow from contact type Z to each compatible agent may be set to zero.

The preferred pairings model may be precomputed (e.g., retrieved from a cache or other storage) or computed in real-time or near real-time as agents become available or unavailable, and/or as contacts of various types with various skill needs arrive at the contact center. After the preferred pairings model has been determined, BP network flow method 900 may proceed to block 930.

At block 930, an available agent may be determined. For example, in an L2 environment, multiple contacts are waiting and available for assignment to an agent, and all agents may be occupied. When an agent becomes available, the agent may be assigned to one of the waiting contacts without remaining idle. In some embodiments, the preferred pairings model determined at block 920 may be determined for the first time or updated after the determination of an available agent at block 830. For example, there may be three contacts waiting in queue, each of a different skill and type. a BP skill-based payout matrix may be determined for the three instant waiting contacts, and a BP network flow may be determined for the three instant waiting contacts based on the BP skill-based payout matrix. Thus, the preferred pairings model may be determined at that time for those three waiting contacts.

In some embodiments, the preferred pairings model may account for some or all of the potentially available agents, even though the particular agent to be paired is already known to BP network flow method 900 because the agent has already been determined at block 930. After the available agent has been determined at block 930 (and the preferred pairings model has been generated or updated, in some embodiments), the BP network flow method 900 may proceed to block 940.

At block 940, at least one preferred contact-agent pairing among the available agent and the available contacts may be determined. After at least one preferred contact-agent pairing has been determined, BP network flow method 900 may proceed to block 950.

At block 950, one of the at least one preferred contact-agent pairings may be selected. In some embodiments, the selection may be at random, such as by using a pseudorandom number generator. The likelihood (or probability) of selecting a given one of the at least one preferred contact-agent pairings may be based on statistical likelihoods described by the BP model. If there is only one preferred contact-agent pairing, there may be no need for random selection in some embodiments as the selection may be trivial. After selecting one of the at least one preferred contact-agent pairings, BP network flow method 900 may proceed to block 960.

At block 960, the selected pairing may be outputted for connection in the contact center system. For example, a computer processor embedded within or communicatively coupled to the contact center system or a component therein such as a BP module may output the preferred pairing selection (or recommended pairing, or pairing instruction) to be received by another component of the computer processor or the contact center system. In some embodiments, the preferred pairing selection may be logged, printed, displayed, transmitted, or otherwise stored for other components or human administrators of the contact center system. The receiving component may use the preferred pairing selection to cause the selected agent to be connected to the contact for which a pairing was requested or otherwise determined. After the preferred pairing instruction has been outputted, BP network flow method 900 may end.

In some embodiments, a BP payout matrix and network flow model may be used in L3 environments (i.e., multiple agents available and multiple contacts waiting in queue). In some embodiments, the network flow model may be used to batch-pair multiple contact-agent pairings simultaneously. BP pairing under L3 environments is described in detail in, for example, U.S. patent application Ser. No. 15/395,469, which is incorporated by reference herein. In other embodiments, a BP network flow model may be used when a contact center system is operating in L1 and/or L2 environments, and an alternative BP pairing strategy when the contact center system is operating in L3 (or L0) environments.

In the examples described above, the BP network flow model targets a balanced agent utilization (or as close to balanced as would be feasible for a particular contact center environment). In other embodiments, a skewed or otherwise unbalanced agent utilization may be targeted (e.g., "Kappa" techniques), and/or a skewed or otherwise unbalanced contact utilization may be targeted (e.g., "Rho" techniques). Examples of these techniques, including Kappa and Rho techniques, are described in detail in, e.g., the aforementioned U.S. patent application Ser. No. 14/956,086 and Ser. No. 14/956,074, which have been incorporated by reference herein.

In some embodiments, such as those in which a BP module (e.g., BP module 140) is fully embedded or otherwise integrated within a contact center switch (e.g., central switch 110, contact center switch 120A, etc.), the switch may perform BP techniques without separate pairing requests and responses between the switch and a BP module. For example, the switch may determine its own cost function or functions to apply to each possible pairing as the need arises, and the switch may automatically minimize (or, in some configurations, maximize) the cost function accordingly. The switch may reduce or eliminate the need for skill queues or other hierarchical arrangements of agents or contacts; instead, the switch may operate across one or more virtual agent groups or sets of agents among a larger pool of agents within the contact center system. Some or all aspects of the BP pairing methodology may be implemented by the switch as needed, including data collection, data analysis, model generation, network flow optimization, etc.

In some embodiments, such as those optimizing virtual agent groups, models of agent nodes in network flows may represent sets of agents having one or more agent skill/type combinations for agents found anywhere within the contact center system, regardless of whether the contact center system assigns agents to one or more skill queues. For example, the nodes for Agents 401, 402, and 403 in FIGS. 4B-4G may represent virtual agent groups instead of individual agents, and a contact assigned to a virtual agent group may be subsequently assigned to an individual agent within the virtual agent group (e.g., random assignment, round-robin assignment, model-based behavioral pairing, etc.). In these embodiments, BP may be applied to a contact at a higher level within the contact center system (e.g., central switch 101 in FIG. 1), before a contact is filtered or otherwise assigned to an individual skill queue and/or agent group (e.g., either contact center switch 120A or contact center switch 120B in FIG. 1).

The application of BP earlier in the process may be advantageous insofar as it avoids scripts and other prescriptive techniques that conventional central switches use to decide to which queue/switch/VDN a contact should be assigned. These scripts and other prescriptive techniques may be inefficient and suboptimal both in terms of optimizing overall contact center performance and achieving a desired target agent utilization (e.g., balanced agent utilization, minimal agent utilization imbalance, a specified amount agent utilization skew).

At this point it should be noted that behavioral pairing in a contact center system in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with behavioral pairing in a contact center system in accordance with the present disclosure as described above. Alternatively, one or more processors operating in accordance with instructions may implement the functions associated with behavioral pairing in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method comprising:
   determining, by at least one computer processor communicatively coupled to and configured to operate in a contact center system, a set of agents for the contact center system, wherein each agent of the set of agents is associated with at least one agent skill of a plurality of agent skills and an agent availability;
   determining, by the at least one computer processor, a set of contact types for the contact center system, wherein each contact type is associated with an expected availability and at least one skill requirement, wherein each of the at least one skill requirement corresponds to at least one agent skill of the plurality of agent skills;
   generating, by the at least one computer processor, a plurality of feasible contact-agent pairings for establishing, in a switch module of the contact center system, communication connections between the set of agents and the set of contact types;
   generating, by the at least one computer processor, a first network flow model based on the plurality of feasible contact-agent pairings; and
   applying, by the at least one computer processor, an optimization function to the first network flow model to provide a second network flow model, wherein the optimization function provides a threshold utilization of agents based on the agent availability of each agent and provides a threshold utilization of contact types based on the expected availability of each contact type.

2. The method of claim 1, wherein the optimization function comprises at least one of a maximum flow algorithm and a linear programming algorithm.

3. The method of claim 1, wherein the second network flow model identifies proportions of contact-agent pairings between agents of the set of agents and contact types of the set of contact types.

4. The method of claim 1, wherein the optimization function further maximizes an expected value for at least one call center metric, wherein the at least one call center metric comprises at least one of revenue generation, call handle time, and customer satisfaction.

5. The method of claim 1, wherein determining the plurality of feasible contact-agent pairings comprises determining a payout matrix based on historical contact-agent outcome data.

6. The method of claim 1, wherein the optimization function further comprises normalizing supply nodes of the first network flow model and normalizing demand nodes of the first network flow model.

7. The method of claim 1, wherein the optimization function determines at least one feasible contact-agent pairing of the plurality of feasible contact-agent pairings to have an optimal flow solution of zero.

8. A system comprising:
   at least one computer processor communicatively coupled to and configured to operate in the contact center system, wherein the at least one computer processor is further configured to:
   determine a set of agents for the contact center system, wherein each agent of the set of agents is associated with at least one agent skill of a plurality of agent skills and an agent availability;
   determine a set of contact types for the contact center system, wherein each contact type is associated with an expected availability and at least one skill requirement, wherein each of the at least one skill requirement corresponds to at least one agent skill of the plurality of agent skills;
   generate a plurality of feasible contact-agent pairings for establishing, in a switch module of the contact center system, communication connections between the set of agents and the set of contact types;
   generate a first network flow model based on the plurality of feasible contact-agent pairings; and
   apply an optimization function to the first network flow model to provide a second network flow model, wherein the optimization function provides a threshold utilization of agents based on the agent availability of each agent and provides a threshold utilization of contact types based on the expected availability of each contact type.

9. The system of claim 8, wherein the optimization function comprises at least one of a maximum flow algorithm and a linear programming algorithm.

10. The system of claim 8, wherein the second network flow model identifies proportions of contact-agent pairings between agents of the set of agents and contact types of the set of contact types.

11. The system of claim 8, wherein the optimization function further maximizes an expected value for at least one call center metric, wherein the at least one call center metric comprises at least one of revenue generation, call handle time, and customer satisfaction.

12. The system of claim 8, wherein determining the plurality of feasible contact-agent pairings comprises determining a payout matrix based on historical contact-agent outcome data.

13. The system of claim 8, wherein the optimization function further comprises normalizing supply nodes of the first network flow model and normalizing demand nodes of the first network flow model.

14. The system of claim 8, wherein the optimization function determines at least one feasible contact-agent pairing of the plurality of feasible contact-agent pairings to have an optimal flow solution of zero.

15. An article of manufacture comprising:
   a non-transitory processor readable medium; and
   instructions stored on the medium;
   wherein the instructions are configured to be readable from the medium by at least one computer processor communicatively coupled to and configured to operate in the contact center system and thereby cause the at least one computer processor to operate so as to:
   determine a set of agents for the contact center system, wherein each agent of the set of agents is associated with at least one agent skill of a plurality of agent skills and an agent availability;
   determine a set of contact types for the contact center system, wherein each contact type is associated with an expected availability and at least one skill requirement, wherein each of the at least one skill requirement corresponds to at least one agent skill of the plurality of agent skills;
   generate a plurality of feasible contact-agent pairings for establishing, in a switch module of the contact center system, communication connections between the set of agents and the set of contact types;
   generate a first network flow model based on the plurality of feasible contact-agent pairings; and
   apply an optimization function to the first network flow model to provide a second network flow model, wherein the optimization function provides a threshold utilization of agents based on the agent availability of each agent and provides a threshold utilization of contact types based on the expected availability of each contact type.

16. The article of manufacture of claim 15, wherein the optimization function comprises at least one of a maximum flow algorithm and a linear programming algorithm.

17. The article of manufacture of claim 15, wherein the second network flow model identifies proportions of contact-agent pairings between agents of the set of agents and contact types of the set of contact types.

18. The article of manufacture of claim 15, wherein the optimization function further maximizes an expected value for at least one call center metric, wherein the at least one call center metric comprises at least one of revenue generation, call handle time, and customer satisfaction.

19. The article of manufacture of claim 15, wherein determining the plurality of feasible contact-agent pairings comprises determining a payout matrix based on historical contact-agent outcome data.

20. The article of manufacture of claim 15, wherein the optimization function further comprises normalizing supply nodes of the first network flow model and normalizing demand nodes of the first network flow model.

21. The article of manufacture of claim 15, wherein the optimization function determines at least one feasible contact-agent pairing of the plurality of feasible contact-agent pairings to have an optimal flow solution of zero.

* * * * *